(12) United States Patent
Kim et al.

(10) Patent No.: US 8,368,283 B2
(45) Date of Patent: Feb. 5, 2013

(54) STATOR FOR BLDG MOTOR BLDC MOTOR HAVING DOUBLE ROTORS/ SINGLE STATOR AND VEHICLE COOLER USING THE SAME

(75) Inventors: Byoung Kyu Kim, Seoul (KR); Kyu Hyuk Jeong, Gwacheon-si (KR); Jong Hoon Lee, Incheon (KR)

(73) Assignee: Amotech Co., Ltd., Incheon (KR)

( * ) Notice: Subject to any disclaimer, the term of this patent is extended or adjusted under 35 U.S.C. 154(b) by 399 days.

(21) Appl. No.: 12/450,985

(22) PCT Filed: Apr. 22, 2008

(86) PCT No.: PCT/KR2008/002255
§ 371 (c)(1),
(2), (4) Date: Mar. 16, 2010

(87) PCT Pub. No.: WO2008/130176

PCT Pub. Date: Oct. 30, 2008

(65) Prior Publication Data
US 2010/0186687 A1 Jul. 29, 2010

(30) Foreign Application Priority Data

Apr. 23, 2007 (KR) .................. 10-2007-0039305

(51) Int. Cl.
*H02K 1/12* (2006.01)
*H02K 1/28* (2006.01)
*H02K 16/02* (2006.01)
(52) U.S. Cl. .............. 310/266; 310/68 R; 310/194
(58) Field of Classification Search .............. 310/43, 310/68 R, 194, 216.008, 216.057, 216.074, 310/265–266
See application file for complete search history.

(56) References Cited

U.S. PATENT DOCUMENTS

| | | | | |
|---|---|---|---|---|
| 4,554,473 A * | 11/1985 | Muller | | 310/67 R |
| 6,992,419 B2 * | 1/2006 | Kim et al. | | 310/266 |
| 7,443,074 B2 * | 10/2008 | Kim et al. | | 310/266 |
| 7,652,406 B2 * | 1/2010 | Kim et al. | | 310/266 |
| 7,687,969 B2 * | 3/2010 | Kim et al. | | 310/266 |
| 7,944,112 B2 * | 5/2011 | Kim et al. | | 310/266 |
| 7,960,893 B2 * | 6/2011 | Kim et al. | | 310/266 |
| 2002/0125782 A1 * | 9/2002 | Peachee et al. | | 310/166 |

FOREIGN PATENT DOCUMENTS

| | | |
|---|---|---|
| JP | P2004-304958 A | 10/2004 |
| KR | 1020010063118 A | 7/2001 |
| KR | 1020040002349 A | 1/2004 |
| KR | 1020050000245 A | 1/2005 |
| KR | 1020060084139 A | 7/2006 |

* cited by examiner

*Primary Examiner* — Tran Nguyen
(74) *Attorney, Agent, or Firm* — Rosenberg, Klein & Lee

(57) ABSTRACT

Provided are a stator for a brushless direct-current (BLDC) motor, a BLDC motor having a double-rotor/single-stator structure, and a vehicle cooler using the same, which uses a printed circuit board for an assembly that automatically sets an assembly position of stator core assemblies, to thereby secure waterproof, light-weight, and high power features. The stator includes a holder, a boss which has built-in bearings in order to support a rotational axis, and which enables the rotational axis to be rotated, a number of stator core assemblies which respectively enclose bobbins having inner and outer flanges at the inner and outer sides of a number of division type stator cores and in which coils are wound around the bobbins, and a printed circuit board for an assembly in which each stator core assembly is automatically position-set and then assembled and both end portions of the coil are mutually connected by each phase of U, V and W. After each stator core assembly has been temporarily assembled on the assembly PCB, the stator core assembly is insert molded using thermosetting resin to thereby integrally form the holder and the boss in the stator.

8 Claims, 22 Drawing Sheets

TOX

TOX FLAT

SPOT WELDING

RIVETING

STATOR FOR BLDG MOTOR BLDC MOTOR HAVING DOUBLE ROTORS/ SINGLE STATOR AND VEHICLE COOLER USING THE SAME

TECHNICAL FIELD

The present invention relates to a stator for a brushless direct-current (BLDC) motor, a BLDC motor having a double-rotor/single-stator structure, and a vehicle cooler using the same. More particularly, the present invention relates to a stator for a brushless direct-current (BLDC) motor, a BLDC motor having a double-rotor/single-stator structure, and a vehicle cooler using the same, in which a printed circuit board (PCB) for assembly that automatically sets an assembly position of a stator core assembly, to thus improve productivity, the whole surface of the stator is molded into an insulation material, to thus make the stator processed to have a waterproof performance, and a BLDC motor is employed to thereby attain high power, low weight and miniaturization.

BACKGROUND ART

An interest for an electric battery car that gets a drive energy from an electrical energy without getting the drive energy from a fossil fuel (gasoline) has been being amplified for reason such as pollution problems. Since this battery car gets the drive energy from the electrical energy, there is no exhaust gas, and there is an advantage that noise is very small.

However, the battery car emits much heat at the time of converting direct-current (DC) power that is supplied from a high-capacity battery into alternating-current (AC) power that has a variable frequency through an inverter to thus get a drive energy, the inverter should be certainly cooled or the heat emitted from the inverter should be radiated.

In general, a vehicle cooler includes a motor that generates a rotational force, an impeller that is combined with the rotor of the motor to thereby circulate air, and a radiator which is a cooler that cools or radiates heat.

At present, a fuel cell electric vehicle (FCEV) or a hybrid vehicle employs components such as a power integrated circuit (IC) chip, a metal oxide semiconductor field effect transistor (MOSFET), and an insulated gate bipolar transistor (IGBT) as a drive system for driving an electric motor, and requires that fuel cells or power components should be cooled so that they should not rise up to not less than a predetermined temperature.

In the case that fuel cells or power components rise up to more than a predetermined temperature, a vehicle speed is limited, or life of a fuel cell is shortened. Thus, a cooler which cools the fuel cells or power components is required, and a brush type of a DC motor is applied as the cooler.

In addition, a vehicle adopting a general gasoline engine drives a cooler having a motor power of 250 W in order to prevent temperature of the engine from rising up to a predetermined temperature.

The above-described brush type of the DC motor is not proper for driving an impeller of a cooler in a battery car. That is, in order to reinforce a cooling performance of a battery car, a motor power should be increased. In the case that a high power DC motor of high power, for example, 400-500 W is used, it is general that two DC motors each having a capacity of 250 W are used due to a big abrasion rate of a brush. In this case, a structural design of the battery car is complicated, and an amount of electric power consumption of a cooler is increased. In addition, in the case of a vehicle that a hydrogen fuel electric cell is mounted among battery cars, danger of fire is very high due to a flame which may occur between a hydrogen gas and a brush in a brush type DC motor.

In addition, a DC motor applied in a conventional battery car does not have a waterproof structure. Accordingly, the DC motor may be frequently influenced much because of bad weather such as snow, rain or fog.

Therefore, a BLDC motor that does not cause any problem by a brush and is not influenced because of the weather, for example, that is processed in waterproof and is not influenced by the weather circumstance should be presented so as to be applied to a cooler in the battery car.

In addition, as performance of the battery car is improved, a BLDC motor of high power required should be presented. A motor that is used for a cooler for enhancing vehicle performance is processed into a waterproofed structure so that the motor is not influenced under the weather circumstance. Further, size of the motor is minimized to thus minimize a space that occupies in a vehicle. Still further, the motor should have higher power than that of the other motors of identical size.

Meanwhile, this applicant proposed a BLCD motor of a radial core type double-rotor mode in the Korean Patent Laid-open Publication No. 2004-2349.

The BLCD motor proposed by the same applicant as that of the present invention employs a double-rotor/single-stator structure to thus enable perfect division of a stator core and maximize a winding efficiency of coil.

In addition, in order to improve an assembly of a division type stator core through the Korean Patent Laid-open Publication No. 2005-245, a stator structure and a BLCD motor using the stator structure was proposed in which a number of stator core assemblies are automatically position-set in and fixed to an annular core support, so as to be connected with divided coil.

By the way, the core holder requires for an insert molding process of integrally forming a pair of guide flanges and/or a number of coupling protrusion pairs which are necessary for automatically position-setting a division type stator core assembly in a PCB for connection of an annular band structure having a number of conduction lines and bonding pads which are necessary for mutually connecting coil on the lower surface of the core holder.

Moreover, the core holder has a structure that the stator core assembly are temporarily assembled in an annular plate formed of the PCB and the pair of the guide flanges, to thereby attain a bulk molding compound (BMC) molding. However, since the BMC molding material has a feature that mutual coherence for the PCB annular plate is weak, a stator holder enclosing the upper and lower surfaces of the PCB has a small contact area between the upper/lower portions of the PCB. Accordingly, there is a problem that coherence is weak.

DISCLOSURE

Technical Problem

To solve the above problems, it is an object of the present invention to provide a stator for a brushless direct-current (BLDC) motor, in which a printed circuit board (PCB) for an assembly that automatically sets an assembly position of a number of stator core assemblies is patterned to have only a minimized portion necessary for coil connection, to thereby maximize a contact area of thermosetting resin that is molded on the upper/lower portions of the assembly PCB, and to thereby make a worker easily assemble the stator to thus improve productivity.

It is another object of the present invention to provide a stator for a brushless direct-current (BLDC) motor, in which additional insulation is not required by molding the whole surface of the stator, and in which the stator is processed into a waterproof structure by an insulation material, so that the stator is not influenced under the weather environment such as snow, rain, and fog when the stator is applied in a radiator for a vehicle, and a sharp portion which may injure an assembly worker by a protruded external form of the stator is not protruded, to thereby secure worker's safety.

It is still another object of the present invention to provide a stator for a brushless direct-current (BLDC) motor and a BLDC motor of a double-rotor/single-stator structure using the same, in which the double-rotor/single-stator structure BLDC motor is applied in a cooler for a vehicle, to thereby secure high power and to thus improve vehicle performance with only a single BLDC motor.

It is yet another object of the present invention to provide a BLDC motor of a double-rotor/single-stator structure and a cooler for a vehicle using the same, in which a single BLDC motor is applied in the cooler for the vehicle, to thereby reduce the whole weight of the vehicle as well as minimize a space occupied by the BLDC motor in the vehicle.

Technical Solution

To accomplish the above object of the present invention, according to an aspect of the present invention, there is provided a stator for a brushless direct-current (BLDC) motor, the stator comprising: a holder; a boss which is extended vertically from the central portion of the holder, and which has first and second built-in bearings in order to support a rotational axis, and around the inner circumference of which the rotational axis can be rotated; a number of stator core assemblies which respectively enclose bobbins having inner and outer flanges in which first and second coupling protrusions are formed at the lower-central ends of the inner and outer sides of a number of division type stator cores and coils are wound around the bobbins; and a printed circuit board (PCB) for an assembly in which each stator core assembly is automatically position-set and then assembled and both end portions of the coil are mutually connected by each phase of U, V and W, wherein the assembly PCB comprises: a central area that is formed in an annular form, and comprises a number of conduction lines which are printed on the lower surface to connect the coil mutually by each phase; and a number of coupling areas which are smaller than the area of the lower end of the stator core assemblies and are extended radially from the central area, and in which first and second coupling grooves accommodating the first and second coupling protrusions are provided at positions corresponding to the first and second coupling protrusions of the stator core, to thereby automatically position-set each of the stator core assemblies.

Preferably but not necessarily, the stator for the BLDC motor further comprises: connection pins that are integrally inserted to the corners of the inner or outer flange of the bobbin and electrically connect one end of each coil; and through-holes through which the other ends of the coils are withdrawn to the outer or inner flange, wherein after the stator core assemblies have been combined with the assembly PCB, the connection pins that are protruded in an area where the coupling areas are not formed are connected with the conduction lines and the other ends of the coils are made to penetrate the through-holes of the flanges to then be connected with the conduction line to thus connect between the coils of an identical phase.

Preferably but not necessarily, the holder and the boss are integrally formed by insert molding the respective stator core assemblies using thermosetting resin at a state where the stator core assemblies are temporarily assembled on the assembly PCB.

According to another aspect of the present invention, there is also provided a double-rotor/single-stator structure brushless direct-current (BLDC) motor comprising: an impeller; a double-rotor with the upper side surface of which the impeller is combined, and in which a number of N-pole and S-pole magnets are disposed on different concentric circles in an annular form alternately and which comprises inner and outer rotors which are disposed so that the magnets opposing each other and having a predetermined distance between the inner/outer portions are disposed to have a reverse polarity; an integrally built-in type stator which is installed with a mutual gap between the inner and outer rotors, and which is integrally formed in an annular form by insert molding the number of the stator core assemblies using thermosetting resin at a state where the number of the stator core assemblies are temporarily assembled on the assembly PCB on which each division type stator core is automatically position set in which coils are wound around bobbins which are built in the stator core assemblies, and which is fixed to an apparatus through a number of engagement portions which are extended from a holder; a rotational axis whose one end portion is fixed to the center of the double-rotor; and a pair of bearings which support the rotational axis which can be rotated at the center of the stator holder, wherein both end portions of the coils (U, V, W) of an identical phase are connected via a number of conduction lines that are arranged in an annular central area of the assembly PCB, a number of coupling areas each having a pair of coupling grooves are extended radially from the central portion of the stator, and a pair of protrusions which are formed at the lower end of each division type stator core are coupled into the coupling grooves, respectively.

Preferably but not necessarily, the built-in type stator comprises: a number of division type stator cores at the lower end portions of which the pair of coupling protrusions are formed; a number of insulation bobbins that enclose the number of the division type stator cores; a number of coils that are wound on the outer circumference of the number of the bobbins; a PCB for an assembly comprising a central area in which a number of conduction lines are arranged to connect the number of coils by an identical phase and a number of coupling areas accommodating the pair of the coupling protrusions of the stator core so that the number of the stator core assemblies are automatically position-set at a predetermined interval.

Preferably but not necessarily, the integrally built-in type stator further comprises a Hall element which is position set to oppose the lower portion of the inner rotor, and which detects polarity of the magnet.

Preferably but not necessarily, the double-rotor/single-stator structure brushless direct-current (BLDC) motor further comprises at least one connection pin which is inserted into the cornet of the inner and/or outer flange of the insulation bobbin and one end of the coils is electrically connected, wherein after the stator core assemblies have been combined with the assembly PCB, the connection pin that is protruded in an area where the coupling areas are not formed is electrically connected with the conduction lines to thus connect between the coils of an identical phase.

Preferably but not necessarily, the double-rotor/single-stator structure brushless direct-current (BLDC) motor further comprises through-holes through which the coils are withdrawn to the outer and/or inner flange of the insulation bobbin, wherein after the stator core assemblies have been combined with the assembly PCB, the coils are made to penetrate the through-holes to then be electrically connected with the conduction line at the central area to thus connect between the coils of an identical phase.

Preferably but not necessarily, the double-rotor comprises: an inner yoke; an inner rotor comprising a number of first N-pole and S-pole magnets which are arranged alternately in an annular form on the outer circumference of the inner yoke; an outer yoke which has a diameter relatively larger than that of the inner yoke to keep a certain distance from the inner yoke; an outer rotor comprising a number of second N-pole and S-pole magnets which are arranged in an annular form alternately on the inner circumference of the outer yoke in which the magnets opposing the number of the first N-pole and S-pole magnets are disposed to have a reverse polarity, respectively; and a yoke frame which fixedly supports the inner yoke and the outer yoke in which a number of fixing grooves that can be combined with the impeller are formed at the upper side of the yoke frame, and wherein the length of the inner yoke is formed shorter than that of the outer rotor by height of the Hall element.

Preferably but not necessarily, the double-rotor/single-stator structure brushless direct-current (BLDC) motor is formed of a 18-core-24-pole structure, and skew is applied to the stator core within one pitch range which is defined as [360°/the number of cores (slots)], so that the outer and inner flanges of the bobbin are extended.

According to still another aspect of the present invention, there is also provided a cooler for a vehicle comprising: a radiator that cools heat produced from a vehicle engine block using a water cooling method; and a cooling unit that generate an air current so that the radiator cools the heat, wherein the cooling unit comprises: a double-rotor in which a number of N-pole and S-pole magnets are disposed on different concentric circles in an annular form alternately and which comprises inner and outer rotors which are disposed so that the magnets opposing each other and having a predetermined distance between the inner/outer portions are disposed to have a reverse polarity; an integrally built-in type stator which is installed with a mutual gap between the inner and outer rotors, and which is integrally formed in an annular form by insert molding a number of stator core assemblies using thermosetting resin at a state where the number of the stator core assemblies in which coils are wound around bobbins respectively having a built-in division type stator core are assembled on a number of coupling areas of an assembly PCB which are provided in a pair of coupling grooves, and both end portions of the coils of an identical phase (U, V, W) are connected through a number of conduction lines provided on the assembly PCB, and which is fixed to the radiator through a number of engagement portions which are extended from a holder; an impeller which is combined with the upper side surface of the double-rotor and which generates the air current so that the heat is cooled by the radiator based on rotation of the double-rotor; a rotational axis whose one end portion is fixed to the center of the double-rotor; and a pair of bearings which support the rotational axis which can be rotated at the center of the stator holder.

Advantageous Effects

As described above, according to the present invention, a contact surface of thermosetting resin can be maximized, and a stator can be assembled using a PCB for an assembly which can automatically position set an assembly position of respective stator core assemblies. Accordingly, productivity of the stator can be enhanced and durability of the stator can be reinforced.

Since the whole surface of the stator is molded, additional insulation is not required. Accordingly, the stator is not influenced under the weather environment such as a high humidity environment of snow, rain, and fog when the stator is applied in a cooler for a vehicle, and a sharp portion which may injure an assembly worker by a protruded external form of the stator is hidden into the insulation, to thereby secure worker's safety.

Moreover, a BLDC motor of a double-rotor/single-stator structure is applied in a cooler for a vehicle, to thereby secure high power to improve a vehicle performance with a single BLDC motor, for example, secure high power of 700-1000 W.

In addition, since a BLDC motor is applied in a cooler for a vehicle, the whole weight of the vehicle can be reduced. Further, since the BLDC motor has a double-rotor/single-stator structure, a space occupied in the vehicle can be minimized.

As described above, a cooler for a vehicle (a hybrid electric vehicle (HEV), a fuel cell battery vehicle (FCEV), a fuel cell electric vehicle (FCEV) and an internal combustion engine vehicle) may be implemented using a BLDC motor. In this case, since the BLDC motor has a double-rotor/single-stator structure, the BLDC motor has power higher than that of the other kinds of motors of an identical size. In addition, since stator cores of the stator are temporarily assembled using a PCB for an assembly and are injection-molded in an insert molding method, the BLDC motor has a waterproof structure. Accordingly, the cooler is not influenced under the weather circumstance.

That is, in the case that a battery car runs under the circumstances where a deviation of altitude is big and under the weather environment of high temperature and low moisture condition, an amount of air which is injected into a fuel cell is reduced to thereby need compensation of air. In addition, the battery car should run normally in an environment of thin air where gravity is reduced and air density is low. Therefore, in the case that the cooler for the battery car is embodied with a double-rotor/single-stator structure BLDC motor, power of motor is big even in the poor weather environment of the big deviation of altitude and the high temperature and low humidity, the battery car can run normally.

DESCRIPTION OF DRAWINGS

The above and other objects and advantages of the present invention will become more apparent by describing the preferred embodiments thereof in detail with reference to the accompanying drawings in which.

BEST MODE

Figure 1:
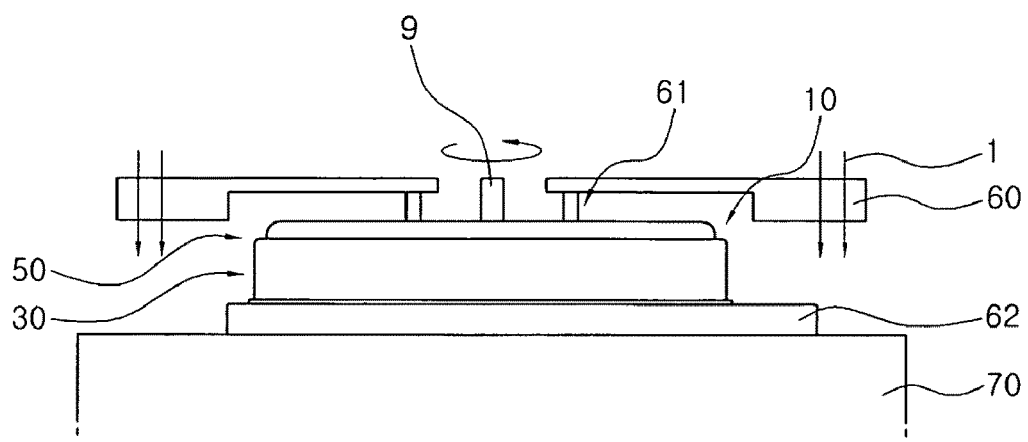
FIG. 1 is a view schematically showing a cooler for a vehicle which employs a BLDC motor according to a preferred embodiment of the present invention.

Hereinbelow, a stator for a double-rotor/single-stator structure motor, a double-rotor/single-stator structure motor using the same, and a vehicle cooler using the same according to a preferred embodiment of the present invention will be described with reference to the accompanying drawings. Like reference numerals denote like elements through the following embodiments.

Hereinbelow, a vehicle employing a cooler according to the present invention is not limited to a battery car, but can be applied to a hybrid electric vehicle (HEV); a fuel cell battery vehicle (FCEV), a fuel cell electric vehicle (FCEV) and an internal combustion engine vehicle.

FIG. 1 is a view showing an example that a vehicle cooler using a BLDC (brushless direct-current) motor according to a preferred embodiment of the present invention performs a cooling operation through a radiator.

Referring to FIG. 1, a vehicle cooler according to the present invention includes: a BLDC motor 10 having a stator 30 and a rotor 50 which are linked to a radiator 70 which is located below the vehicle cooler, via a coupling unit 62; a rotational axis 9 which is located at the central portion of the rotor 50 and integrally formed with the rotor 50; and an impeller 60 combined on the upper side of the rotor 50 via an impeller connection unit 61, respectively.

The vehicle cooler according to the present invention can cool heat generated from a vehicle via the radiator 70 as shown in FIG. 1, or is placed at a position that can cool a driving mechanism or fuel cell of a fuel cell battery car.

For example, in the case of an internal combustion engine car, the radiator 70 is a cooling unit to cool heat generated from an automotive engine by a water cooling method. That is, the radiator 70 can perform a cooling operation with cold air inhaled through a radiator grill, and includes an impeller for preventing hot air from being stagnant at the back of the radiator 70.

The impeller 60 is combined with the rotor 50, and generates air current 1 which radiates and cools heat generated from the vehicle through the radiator 70, by rotation of the rotor 50.

Figure 2A:
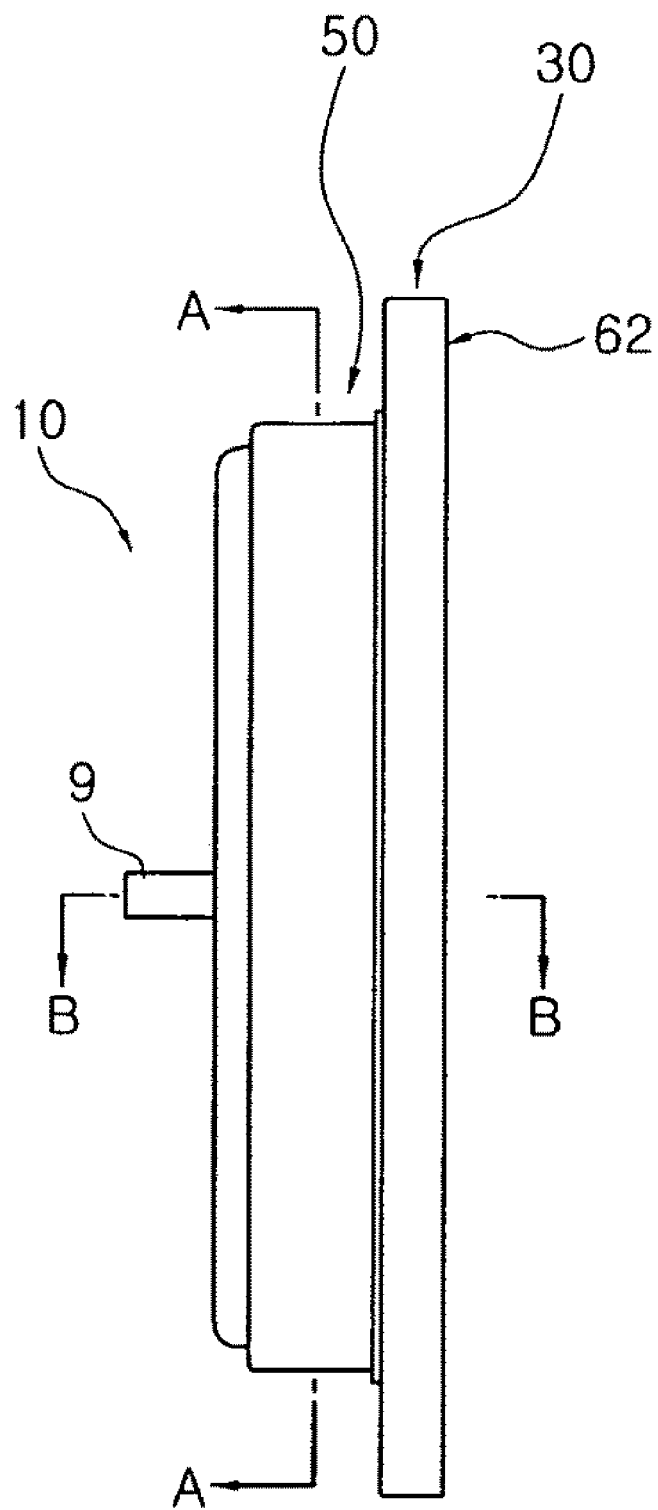
FIG. 2A is a front view for explaining a BLDC motor of a double-rotor/single-stator structure according to a preferred embodiment of the present invention.
Figure 2B:
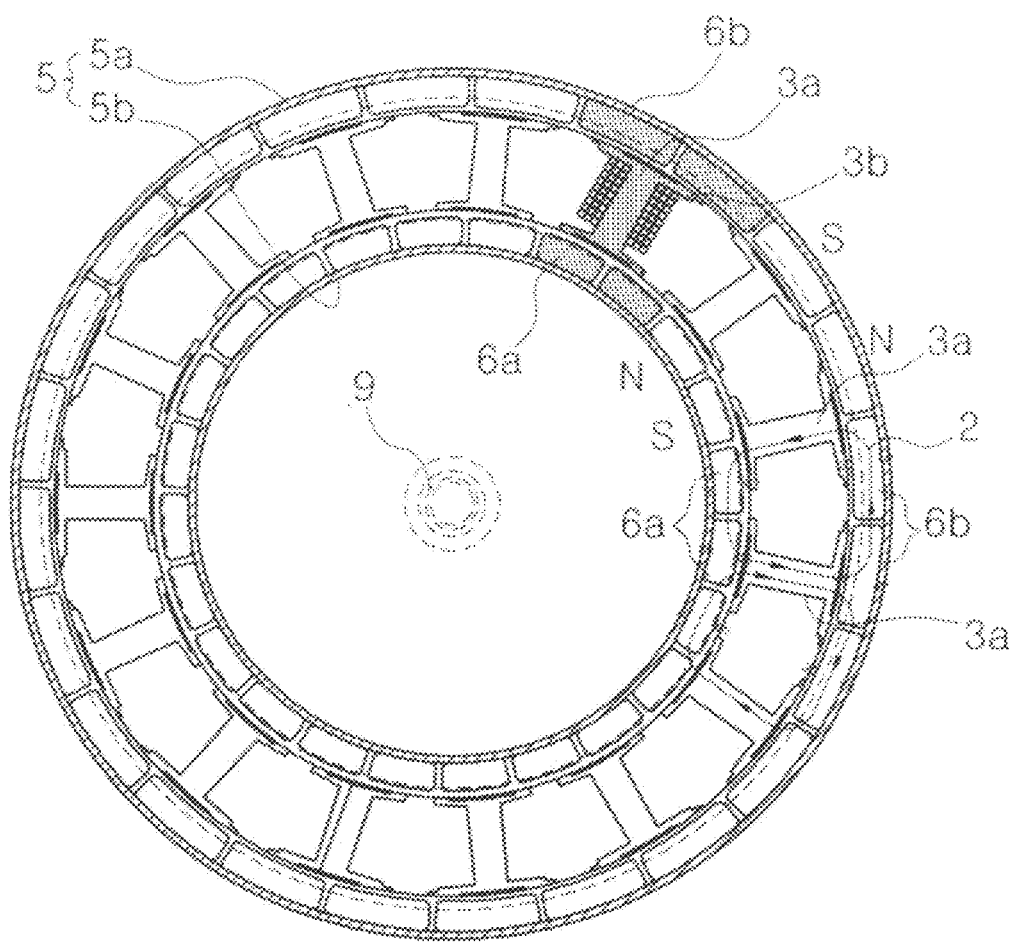
FIG. 2B is a cross-sectional view cut along a line A-A' of FIG. 2A.
Figure 2C:
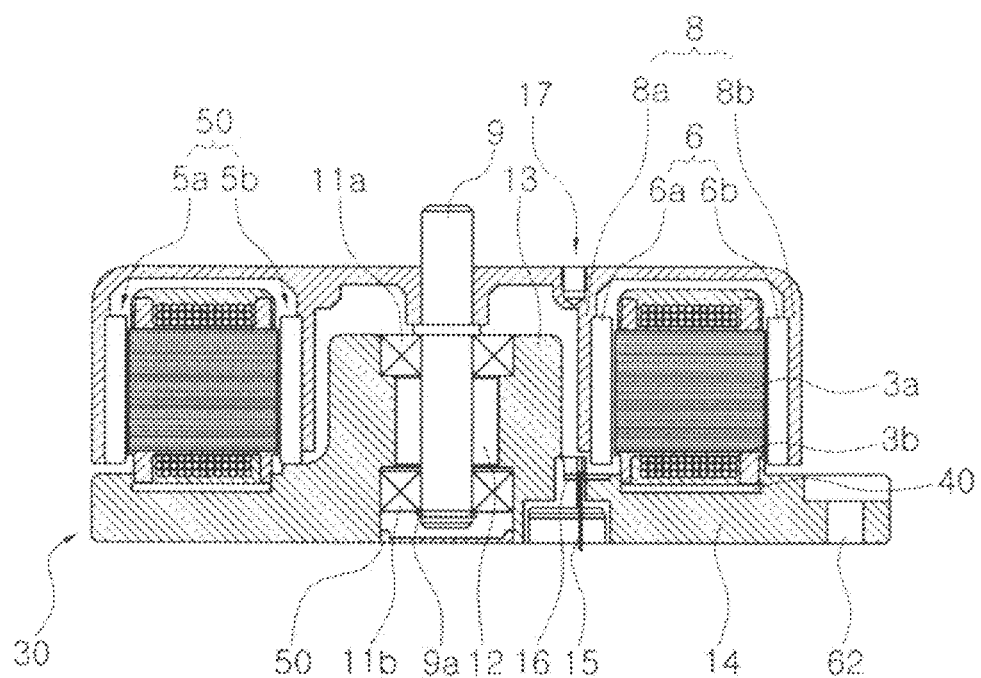
FIG. 2C is a cross-sectional view cut along a line B-B' of FIG. 2A.

In the case of a case where a number of impellers 60 are combined in the upper portion of the rotor 50, a number of stud nuts 17 of FIG. 2C are provided on the rotor 50, and a through-hole is formed in each impeller 60 corresponding to the stud nut 17. Then, a number of bolts pass through the through-holes formed in the impellers 60 to then be combined with the stud nuts 17 by a bolt/nut combination. Otherwise, an impeller 60 can be combined directly on the rotor 50 by a variety of the other well-known methods.

In addition, referring back to FIG. 1, the stator 30 is coupled with and fixed to the radiator 70 through a coupling unit 62 which is extensively formed on the outer circumference of the stator 30.

FIG. 2A is a front view for explaining a BLDC motor of a double-rotor/single-stator structure according to a preferred embodiment of the present invention. FIG. 2B is a cross-sectional view cut along a line A-A' of FIG. 2A. FIG. 2C is a cross-sectional view cut along a line B-B' of FIG. 2A.

In the case of an embodiment of the present invention illustrated in FIGS. 2A to 2C, for example, the impellers 60 are combined on the upper portion of the rotor 50, so as to have a structure of being easily applied to a cooler which is suitable for radiating and cooling heat generated from a vehicle. However, the present invention is not limited thereto. In FIG. 2B, a state where a coil 14 is wound around a stator core 3a is shown for convenience of explanation.

The BLDC motor 10 of a double-rotor/single-stator structure that is illustrated in FIGS. 2A to 2C, includes: a stator 30 which is assembled in an annular form, in which a stator holder 14 is fixed to a radiator 70 by various kinds of connection units such as bolts and nuts through a coupling unit 62, and a coil 3b is wound around a number of perfect division type stator core 3a; a double-rotor 50 in which a number of magnets 6a and 6b are arranged on the inner and outer circumferences of the stator 30 in an annular form with a predetermined gap, and an inner rotor 5a and an outer rotor 5b are supported to a yoke frame 8; and a rotational axis 9 which is supported and rotated by bearings 11a and 11b in a space which is provided by a boss 13 which is vertically extended from the central portion of the stator holder 14, to then be connected to the central portion of the rotor 50.

The stator 30 is integrally formed in an annular form, by insert-molding using thermosetting resin at a state where a number of stator core assemblies 3c are temporarily assembled on a printed circuit board (PCB) 40 for an assembly which is an automatic position setter in which the coil 3b is wound around the outer circumference of a bobbin of the number of the perfect division type stator core 3a in the number of stator core assemblies 3c.

A reference numeral 15 denotes a signal withdrawal terminal with which a drive signal is applied to the coil 3b, and a reference numeral 12 denotes a sleeve.

In addition, a snaps ring 9a is located on lower portion of the rotational axis 9, to prevent secession of the bearing 11a and a rubber cap 50 intercepts alien substance such as dust from being inhaled to a space where the rotational axis 9 is located.

A Hall element 16 is integrally disposed at a position corresponding to the lower end portion of an inner magnet 6a in the stator holder 14 so as to detect polarity of the inner magnet 6a. Therefore, length of the inner yoke 8a is shorter than that of the outer yoke 8b since the lower end portion of the inner yoke 8a is removed up to height of the Hall element 16 so that the Hall element 16 is not be influenced by length of the inner yoke 8a when detecting polarity of the inner magnet 6a.

Therefore, it is desirable that length of the inner yoke 8a is formed shorter than that of the outer yoke 8a, by height of the Hall element 16, or height of the upper surface of the stator holder 14 on which the Hall element 16 is located is formed as low as that of the Hall element 16.

The BLDC motor 10 of the double-rotor/single-stator structure according to the present invention employs the same mechanism as that of the Korean Patent Publication No. 2004-2349 so that the rotor 50 of the double-rotor structure is rotated by the stator 30.

That is, because the magnet 6a and 6b and the division type stator core 3a of the inner rotor 5a and the outer rotor 5b form a perfect magnetic circuit 2 as shown as a flow of arrows in FIG. 2B, it is possible to perfectly divide the stator core 3a.

Therefore, in this invention, it is possible to manufacture a stator 30 into a number of division type stator cores 3a, and to employ a double-rotor 50 to increase power and torque of the BLDC motor 10. Accordingly, the present invention can strengthen performance of radiating and cooling heat that is produced from a vehicle.

In addition, if the BLDC motor 10 of the double-rotor/single-stator structure is applied to a vehicle cooler, it is possible to secure high power to improve vehicle performance with only a single BLDC motor, for example, high power of 700 or 1000 W. Further, since a single BLDC motor is applied in the cooler for the vehicle, it is possible to reduce the whole weight of the vehicle as well as minimize a space occupied by the BLDC motor in the vehicle in the case of the double-rotor/single-stator structure.

Figure 3A:
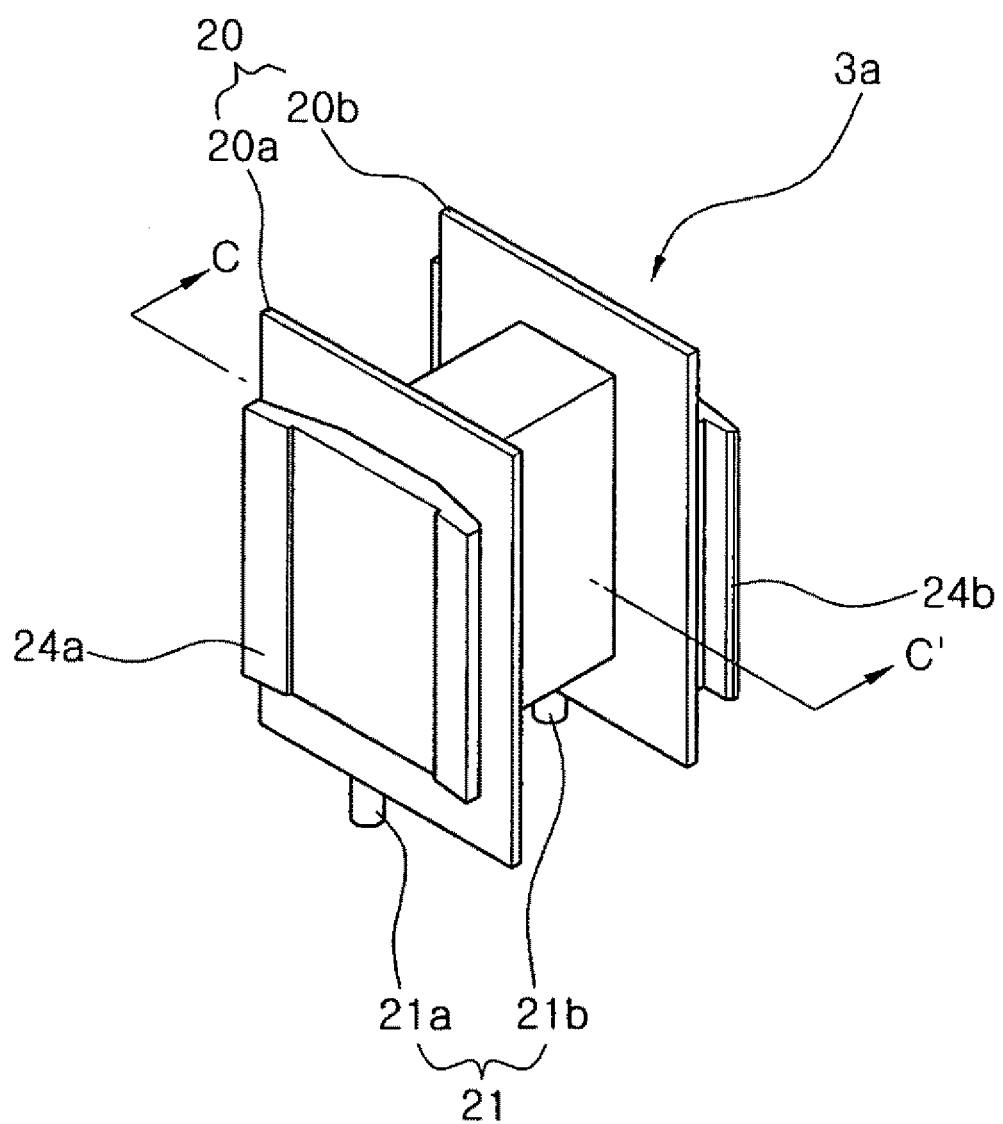
FIG. 3A is a perspective view of a perfect division type stator core which is used in this invention.
Figure 3B:
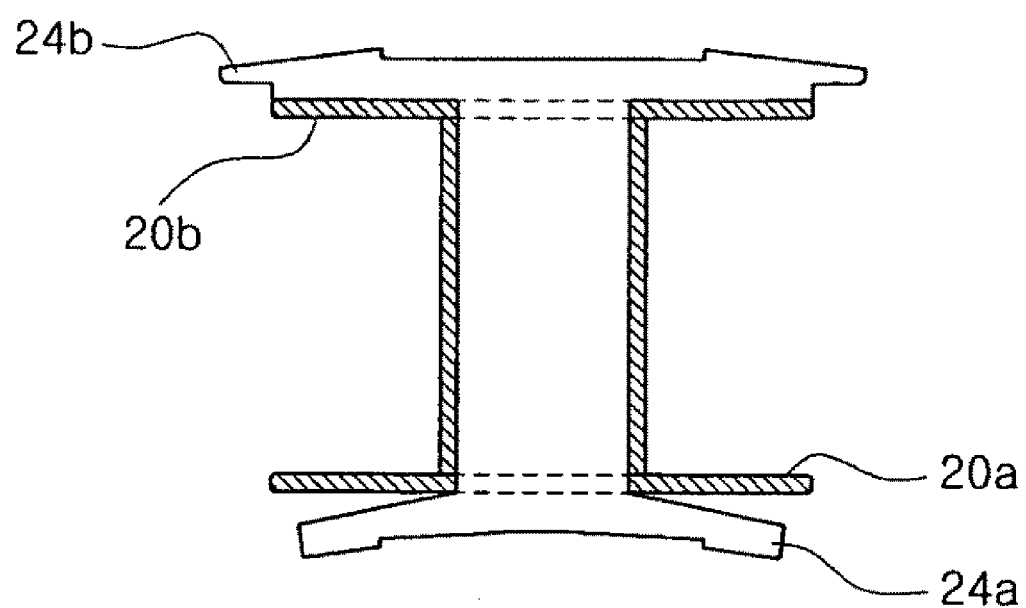
FIG. 3B is a cross-sectional view cut along a line C-C' of FIG. 3A.
Figure 3C:
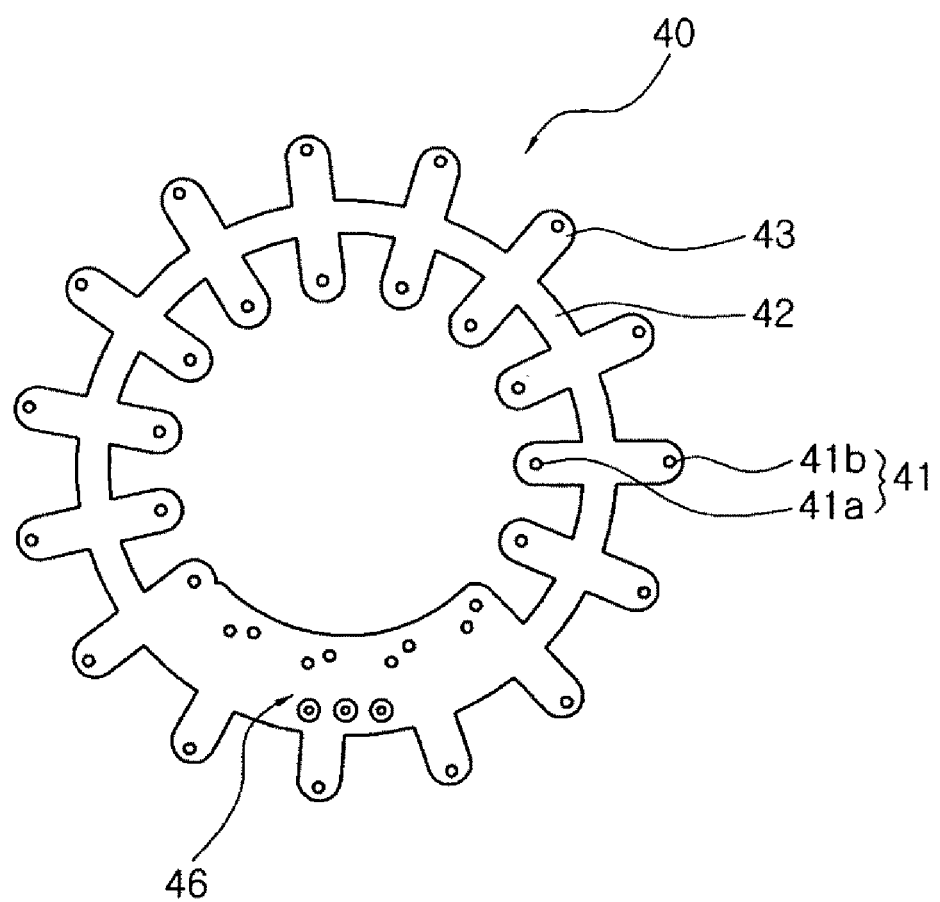
FIG. 3C is a view for explaining a PCB for an assembly according to the present invention.

FIG. 3A is a perspective view of a perfect division type stator core which is used in this invention. FIG. 3B is a cross-sectional view cut along a line C-C' of FIG. 3A. FIG. 3C is a view for explaining a PCB for an assembly according to the present invention.

Referring to FIGS. 3a and 3b, the perfect division type stator core 3a according to this invention is configured to have an I-shaped section for example, (or a T-shaped section). In more detail, a bobbin 20 formed of an insulation material such as thermosetting resin is combined with either side surface of the perfect division type stator core 3a. A box-type portion having a hollow portion is formed in the middle of the bobbin 20. Flanges 20a and 20b are extended at the inner and outer sides of the box-type portion, respectively. A space where the coil 3b is wound is formed between the flanges 20a and 20b.

In addition, the bobbin 20 may be injection-molded using thermosetting resin. Connection pins are provided on the bobbin 20 for interconnection of the coil 3b which is wound by each phase (U, V, W). Otherwise, through-holes for allowing the coil 3b to pass through may be formed at one side or crossed both sides of the inner flange 20a of the bobbin 20.

In this case, it is preferable that the I-shaped stator core 3a and the bobbin 20 are integrally molded and assembled by an insert-molding method using thermosetting resin, but the present invention is not limited thereto.

First and second coupling protrusions 21a and 21b that can be combined to the assembly PCB 40 are formed at the lower-centers of the inner and outer flanges 20a and 20b of the division type stator core 3a, respectively.

Meanwhile, the assembly PCB 40 illustrated in FIG. 3C is used to automatically position-set a stator core assembly 3c where the coil 3b is wound in a space that is provided by the bobbin 20 of the division type stator core 3a and mutually connect both ends of the coil 3b.

As illustrated in FIG. 3C, the assembly PCB 40 is generally configured to have an annular form and has coupling areas 43 where a number of stator core assemblies 3c are combined. For example, first and second coupling grooves 41a and 41b into which first and second coupling protrusions 21a and 21b of the division type stator core 3a can be fitted are provided at both ends of the fifteen coupling areas 43, respectively. The number of the coupling areas 43 of the assembly PCB 40 may vary depending on the number of the stator cores 3a applied in the BLDC motor 10. For example, if the BLDC motor 10 is of a 18-slot (stator core)-24-pole structure, eighteen coupling areas 43 are provided.

A central area 42 of the assembly PCB 40 is formed in an annular form similarly to shape of the stator 30. The fifteen coupling areas 43 where the stator core assemblies 3c are combined has a smaller area than that of the lower end portion of the stator core assemblies 3c, respectively, and is radially formed from the center of the stator 30.

That is, the assembly PCB 40 includes: a central area 42 where the stator core assemblies 3c are supported and combined according to an annular form of the stator 30; coupling areas 43 where the stator core assemblies 3c are position-set and combined; and a circuit area 46 which receives a position detection signal that is generated from the Hall element 16 according to polarity of the magnet 6 and connects with a coil withdrawal terminal 15 which applies a drive signal to the coil 3b.

In addition, since the inner and outer sides of the central area 42 except the coupling areas 43 do not form the assembly PCB, an adhesive strength between the thermosetting resin and the assembly PCB 40 is maximized when the stator 30 has been injection-molded by an insert-molding method using thermosetting resin, to thereby firmly manufacture the stator 30 of the BLDC motor 10. Accordingly, durability can be strengthened after having injection-molded the stator 30.

It is desirable that the central area 42 of the assembly PCB 40 is formed of a ring shape style in an annular form, and the coupling areas 43 are vertically extended from the central area 42 so as to be smaller than an area of the lower end portion of the stator core assembly 3c, to thus maximize a contact area of thermosetting resin.

The coupling method of the stator core assemblies 3c and the assembly PCB 40 will be briefly described below. The bobbin 20 of the insulation material is integrally combined with the division type stator core 3a by an insert-molding method, and the stator core assembly 3c is combined with the assembly PCB 40 where the coil 3b is wound in the space that is provided by the bobbin 20.

Here, the coupling protrusions 21a and 21b which are formed on the lower portions of the inner and outer flanges 20a and 20b of the bobbin 20 are fitted into the coupling grooves 41a and 41b which are formed at the coupling areas 43 of the assembly PCB 40, and automatically position-set and assembled.

Here, a distance spaced between the coupling area 43 and the assembly PCB 40 can be decided according to size of the stator core assembly 3c, and a distance separated between the coupling areas 42 is consistently kept.

Therefore, in the case that a number of stator core assemblies 3c are assembled using the assembly PCB 40, in the stator 30 of this invention, an assembly position is automatically decided by the first and second coupling protrusions 21a and 21b of the bobbin 20 and the first and second coupling grooves 41a and 41b of the PCB40 for assembly. Accordingly, even unskilled workers may perform an assembly work easily, to thus make assembly productivity very excellent.

Moreover, a portion where a PCB is formed on the assembly PCB 40 is minimized, to thereby maximize a contact surface of thermosetting resin. The stator 30 can be assembled using the assembly PCB 40 which automatically position-sets the assembly position of the stator core assembly 3c, to accordingly improve productivity of the stator 30 and reinforce durability of the stator 30.

In addition, because the whole surface of the stator 30 is molded using an insulation material, an additional insulation material is not required. Accordingly, the stator is not influenced under the weather environment such as a high humidity environment of snow, rain, and fog when the stator is applied in a cooler for a vehicle, and a sharp portion which may injure an assembly worker by a protruded external form of the stator is hidden into the insulation, to thereby secure worker's safety.

Moreover, the stator 30 is temporarily assembled so that the stator core assemblies 3c are combined on the assembly PCB 40. Here, since the inner and outer extension portions 24a and 24b of the stator core 3a have inward and outward curved surfaces at predetermined curvatures, respectively, a deviation from roundness of the inner and outer circumferences of the number of the stator core assemblies 3c becomes high. Accordingly, the stator 30 is proximate between the inner rotor 5a and the outer rotor 5b which are combined with the inner and outer portions of the stator 30, as well as keeps a predetermined magnetic gap therebetween.

Figure 4A:
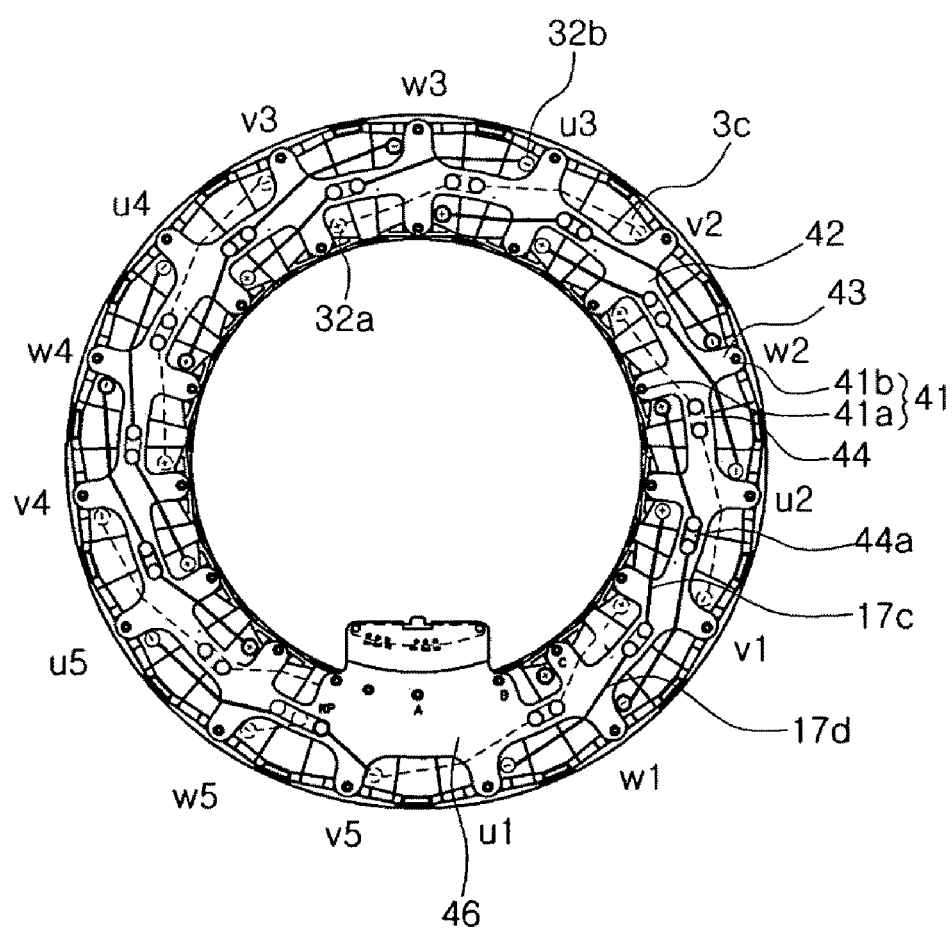
FIGS. 4A to 4C are views showing a state where a stator core assembly is assembled with a PCB for an assembly and both end portions between coils of an identical phase is mutually connected, a state where the stator core is disposed, and both end portions between the coils of an identical phase in a three phase (U, W, V) drive system are mutually connected, respectively.
Figure 4B:
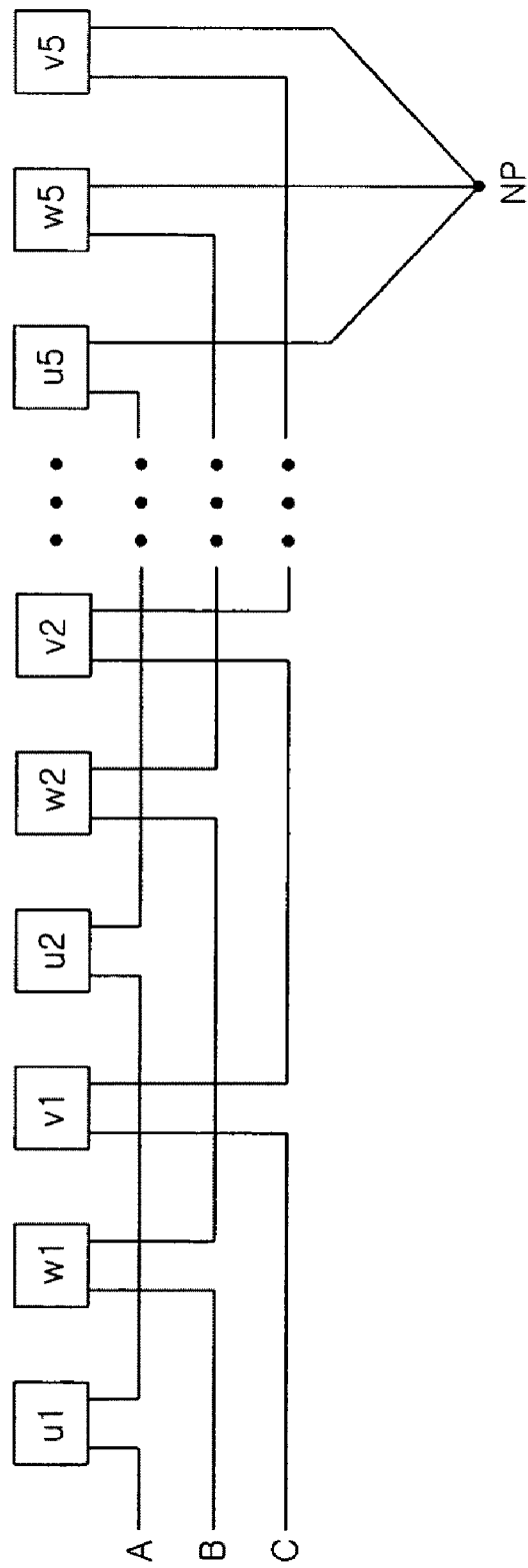
Figure 4C:
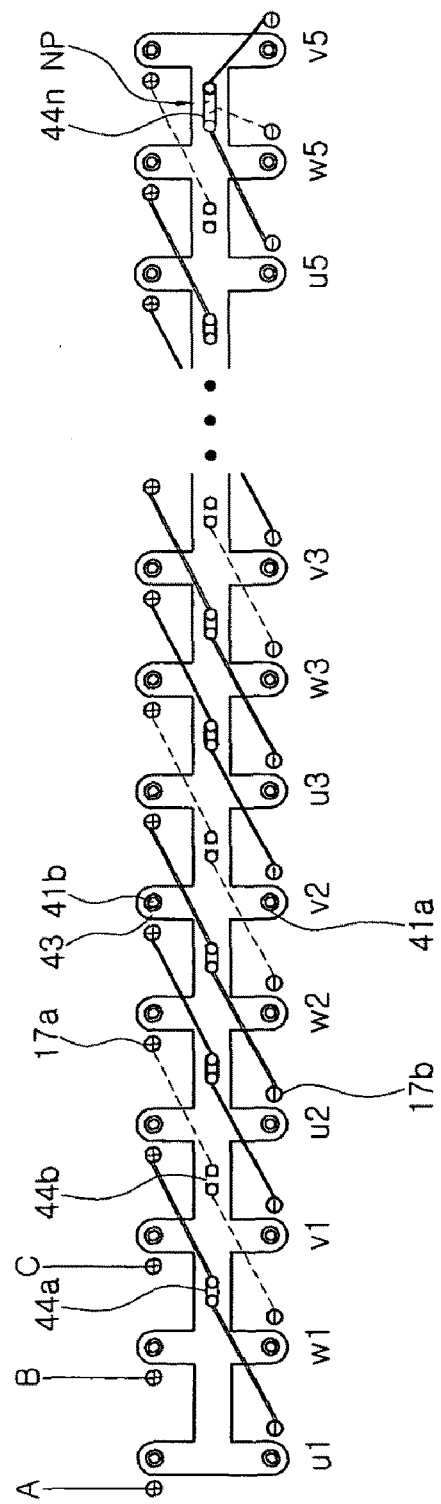

FIG. 4A is a view showing a state where a stator core assembly is assembled with a PCB for an assembly and both end portions between coils of an identical phase is mutually connected, FIG. 4B is a view showing a state where the stator core of the BLDC motor according to the present invention is disposed, and FIG. 4C is a view showing a method of mutually connecting both end portions between the coils of an identical phase in a three phase (U, W, V) drive system.

Referring to FIG. 4A, according to this invention, a number of stator core assemblies u1-v5, w1-w5, and v1-v5 (for example fifteen) are assembled by a three-phase 'Y' connection method using an assembly PCB 40, and a number of conduction lines 44a-44n are arranged at the central area 42 formed on the bottom of the assembly PCB 40, in order to connect both end portions of five coils 3b by each phase U, V, or W.

Here, it is preferable that the number of the conduction lines 44a-44n are arranged at a position where no coupling areas 43 are formed at the central area 42, and are formed into the minimum length in order to easily connect both end portions of the coil 3b by each phase and avoid wiring lines which connects both end portions of the coil 3b from overlapping each other.

Figure 5A:
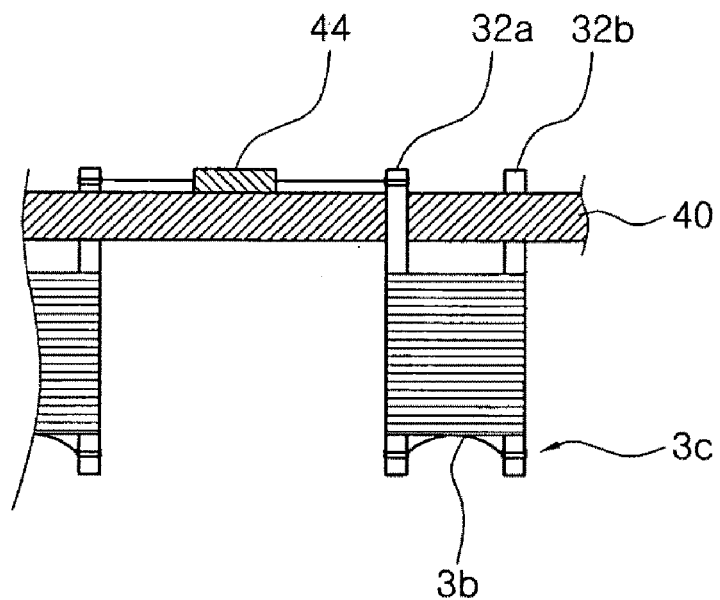
FIGS. 5A to 5C are views for illustrating a mutual connection structure between one coil and another coil, respectively.
Figure 5B:
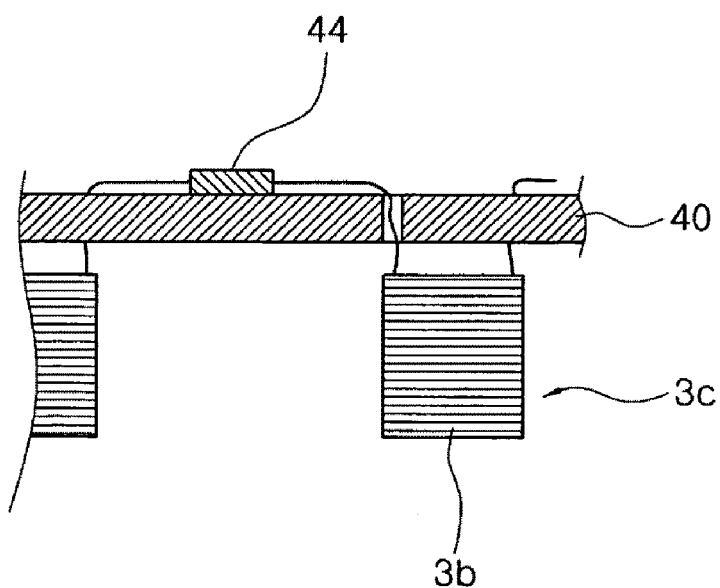
Figure 5C:
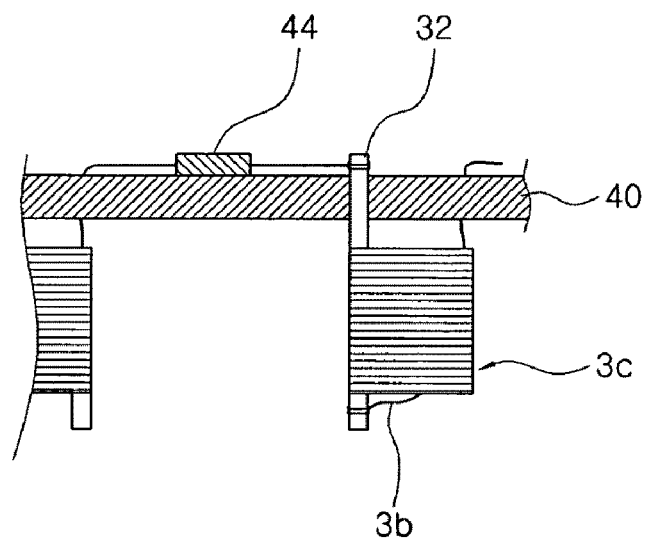

As illustrated in FIG. 5A, as a method of connecting both end portions of the coil 3b, a pair of through-holes (in the diagonal direction) are provided in the bobbin 20 that is combined with the stator core 3a, and start/end wiring lines which are withdrawn from the coil 3b of the stator core assembly 3c are connected to connection pins 32 (for example, 32a and 32b) combined with the respective through-holes, to accordingly connect the start/end wiring lines of the coil 3b by an identical phase. As illustrated in FIG. 5B, a pair of through-holes are formed on flanges 20a and 20b of the bobbin 20, and the coil 3b of the stator core assembly 3c is made to pass through the through-holes formed on the flanges 20a and 20b, to accordingly connect both end portions of the coil 3b. As illustrated in FIG. 5C, one wiring line of one end of the coil 3b is connected to a connection pin 32, and the other wiring line of the other end of the coil 3b is made to pass through the through-holes formed on the flanges 20a and 20b, to accordingly connect both end portions of the coil 3b.

For example, a case where the pair of through-holes (in the diagonal direction) are provided in the bobbin 20 that is combined with the stator core 3a, and the start/end wiring lines which are withdrawn from the coil 3b are connected between both end portion of the coil 3b via the connection pins 32 (for example, 32a and 32b) combined with the respective through-holes, will be described below.

Referring to FIG. 4B, the stator core assembly 3c is assembled on the assembly PCB 40 in sequence of u1-w1-v1-u2-w2-v2-u1-. . . -u5-w5-v5. In this case, the start wiring lines of the stator core assemblies u1, w1, and v1 are connected with input terminals A, B, and C through which drive signals are input, and the end wiring lines of the stator core assemblies u5, w5, and v5 which are located in the fifth stage which is the final stage are mutually connected to form a neutral point (NP).

That is, the drive signals are input into the start wiring lines of the stator core assemblies u1, w1, and v1 from the input terminals A, B, and C, and the end wiring lines of the stator core assemblies u5, w5, and v5 of the fifth stage which is the final stage are mutually connected to form a neutral point (NP).

The positive (+) pins that are illustrated in FIG. 4A are start pins 32a which are connected with the start wiring line, and the negative (−) pins that are illustrated in FIG. 4A are end pins 32b which are connected with the end wiring line. In this case, if the end pin 32b of the u1 stator core assembly 3c can be connected with the start wiring line 32a of the u2 stator core assembly 3c, it can be seen that the coil is connected by each phase.

That is, as illustrated, the end pin 32b of the u1 stator core assembly 3c is connected with a conduction line 44, and the conduction line 44 is connected with the start pin 32a of the u2 stator core assembly 3c. Accordingly, both end portions of the coil 3b of the u1 and u2 stator core assemblies 3c are connected. Here, the conduction line 44 and the start and end pins 32a and 32b can be connected by soldering via jump wires.

In more detail, referring to FIG. 4C, the start wiring lines of the first stage stator core assemblies u1, w1, and v1 are connected with the respective input terminals A, B, and C through which the drive signals are input.

In addition, a number of conduction lines 44a-44n are arranged at the central area 42 between the coupling areas 43 of the assembly PCB 40. The end pin 32b of the u1 stator core assembly 3c is connected with one side of the conduction line 44a, and the other side of the conduction line 44a is connected with the start pin 32a of the u2 stator core assembly 3c. Thus, the end wiring line of the u1 stator core assembly 3c and the start wiring line of the u2 stator core assembly 3c are connected through the conduction line 44a.

Likewise, the end pin 32b of the stator core assembly 3c in V and W phases is connected with the start pin 32a of the stator core assembly 3c in a neighboring identical phase.

In addition, the end wiring line of the fifth stage stator core assemblies u5, w5, and v5 that is the final stage is connected with the final conduction line 44n to thereby form a neutral point.

Since both end portions of the coil 3b of the stator core assembly 3c in a neighboring identical phase are connected through the respective conduction lines 44 that are arranged at the central area 42 of the assembly PCB 40, the stator coil assembly 3c is combined on the assembly PCB 40, and both end portion of the coil 3c of the stator core assembly 3c in an identical phase are easily connected.

FIGS. 5A to 5C are views for illustrating a mutual connection structure between one coil and another coil, respectively. In the case of a first coil connection structure between a coil 3b and another coil 3b of the stator core assembly, a pair of connection pins 32 are integrally inserted into a bobbin 20 of the stator core assembly 3c by an insert-molding method, and both end portions of the coil 3b are connected with the connection pin 32 beforehand, as shown in FIG. 5A.

Then, if the stator core assembly 3c is combined with the assembly PCB 40, the pair of the connection pins 32 are protruded in an area where no coupling areas 43 are not formed. Therefore, the pair of the connection pins 32 can be connected with the conduction line 44 of the assembly PCB 40, respectively and thus both end portions of the coil can be connected by soldering.

In the case of a second coil connection structure, one end of the coil 3b of the stator core assembly 3c is made to pass through a through-hole formed in a flange 20a of the bobbin 20, and then the coil 3b and one end of the conduction line 44 are fixed by soldering through an area where no coupling areas 43 are formed on the assembly PCB 40, to thus connect both end portions of the coil 3b, as shown in FIG. 5B.

In the case of a third coil connection structure, a connection pin 32 is integrally inserted into the bobbin 20 of the stator core assembly 3c by an insert-molding method, and one end of the coil 3b is connected beforehand with the lower end of the connection pin 32, as shown in FIG. 5C.

Then, the connection pin 32 of the stator core assembly 3c is connected with the conduction line 44 of the assembly PCB 40, and the other end of the coil 3b is made to pass through the through-hole formed in the flange 20a of the bobbin 20, and then is connected with the conduction line 44 of the assembly PCB 40, to thus connect both end portions of the coil 3b.

As described above, since a connection of the coil 3b between the stator core assembly 3c is achieved by soldering on the opposing surface through the conduction line 44 of the assembly PCB 40 in this invention, the winding portion and the connection portion in the state core 3a are separated from each other, to thus improve an insulation performance.

An assembly process of the stator 30 of the BLDC motor 10 according to this invention follows.

First, the stator 30 is integrally molded by an insert-molding method, so that each division type stator core 3a is inserted into the hollow portion of the box-type portion of the bobbin 20 and at least one connection pin 32 is inserted into the corners of the flanges 20a and 20b in the bobbin 20.

Thereafter, the coil 3b is wound around the outer circumference between the flanges 20a and 20b of the bobbin 20 which is integrally molded with the stator core 3a, using a general-purpose winding machine, to thus prepare a number of stator core assemblies 3c.

Then, the number of stator core assemblies 3c are combined on the upper portion of the assembly PCB 40, and both ends of the coil 3b are connected on the bottom of the assembly PCB 40 according to one of the coil connection methods by each phase, to thereby temporarily assemble the stator 30. In addition, the Hall element 16 is made to be located at the lower portion of the inner yoke frame 8a, and are arranged on the inner circumference of the stator 30 in order to be integrated by an insert-molding method.

In addition, the stator 30 is molded by molding the lower surface of the stator 30 with thermosetting resin, for example, a bulk molding compound (BMC) such as polyester, by an insert-molding method, so as to cover a space between the number of stator core assemblies 3c and a coil connection portion located at the lower portion of the assembly PCB 40, except for an external opposing surface of the inner/outer extension portions 24a and 24b of each stator core 3a. Accordingly, the stator 30 shown in FIGS. 6A to 6C is obtained.

Figure 6A:
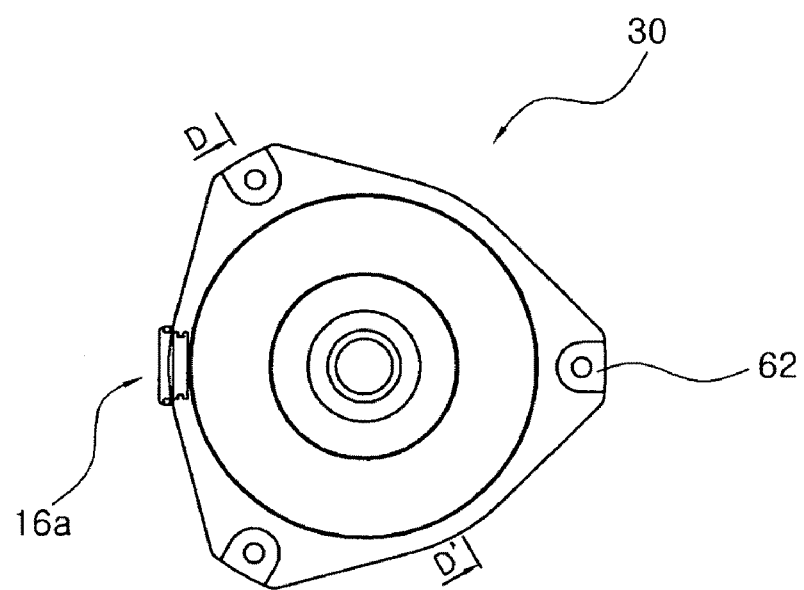
FIGS. 6A and 6B are a plan view and a rear view of a stator for a BLDC motor according to the present invention, respectively.
Figure 6B:
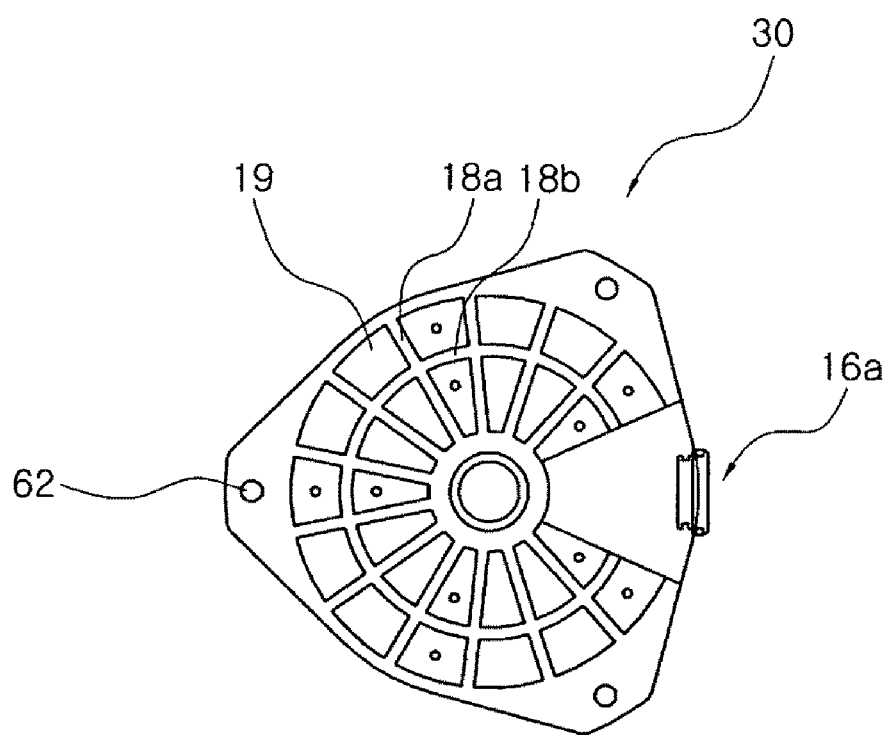

FIGS. 6A and 6B are a plan view and a rear view of a stator for a BLDC motor according to the present invention, respectively. FIG. 6C is a cross-sectional view cut along a line D-D' of FIG. 6A.

Figure 6C:
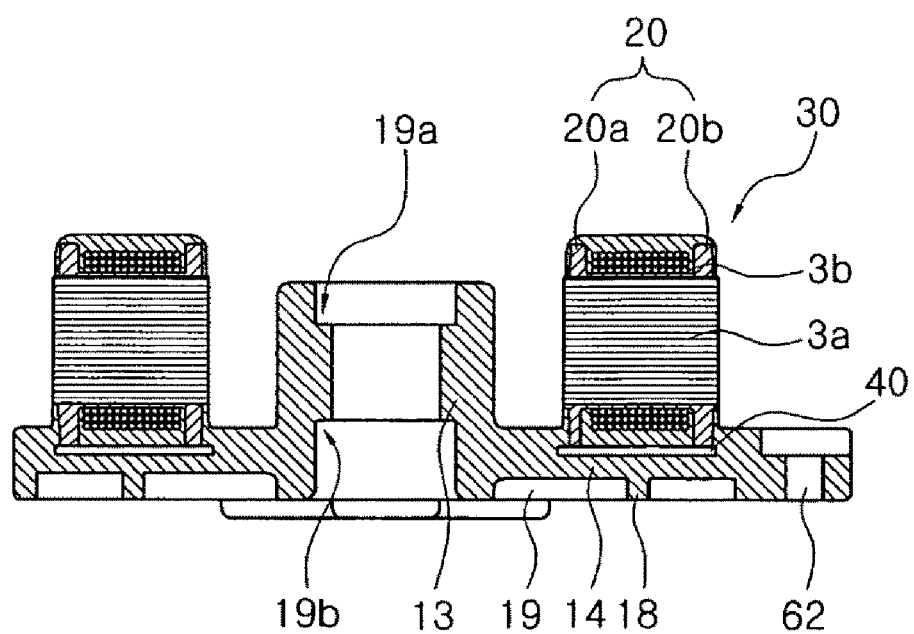
FIG. 6C is a cross-sectional view cut along a line D-D' of FIG. 6A.

Referring to FIGS. 6A to 6C, a substantially triangular stator holder 14 is integrally formed in the stator 30 which is formed through the above-described process. In addition, a coupling unit 62 which has three coupling holes, for example, which are used to be combined with a vehicle radiator 70 is integrally formed in each corner portion of the stator holder 14.

In addition, a space 19 that can get an effect of reducing weight of the stator 30 and a rib 18a of a straight line form and a rib 18b of an annular form for strengthening support strength of the stator 30, are radially formed in the lower portion of the stator holder 14.

That is, when the stator 30 is insert-molded, an empty space 19 is formed by downsizing the stator 30 in order to minimize weight of the stator 30 for example, and the ribs 18a and 18b for reinforcement are formed in order to strengthen the support strength of the stator 30.

As described above, the stator 30 whose whole surface is molded with an insulation material does not require an additional insulation material. The stator is not influenced under the weather environment of high humidity such as snow, rain, and fog when the stator is applied in a radiator for a vehicle, and a sharp portion which may injure an assembly worker by a protruded external form of the stator is not protruded, to thereby secure worker's safety.

Moreover, when the stator 30 is insert-molded in this invention, housings 19a and 19b for installing a pair of bearings 11a and 11b which support the rotational axis 9 in the stator holder 14 are formed in the boss 13, simultaneously. Accordingly, it is possible to make concentricity of each of the pair of the bearings 11a and 11b which are assembled coincide accurately. A frictional force of the rotational axis 9 which supports the bearings 11a and 11b can be minimized.

Further, when the stator 30 is insert-molded, a detection signal of the Hall element 16 is transmitted to a control device and an integrated circuit (IC) assembly 16a that can input drive signals of each phase U, V, or W is formed at one side of the assembly PCB 40.

That is, when the stator 30 is molded, the housings 19a and 19b for bearing installation are formed in the boss 13, so that the center of the pair of bearings 11a and 11b that are assembled in the boss 13 coincides exactly. Accordingly, when the rotational axis 9 supported by the pair of the bearings 11a and 11b rotate by the rotor 50, eccentricity is prevented from occurring.

As illustrated in FIG. 2C, the rotor 50 of the BLDC motor 10 of the double-rotor/single-stator structure according to the present invention is supported by the yoke frame 8 including a pair of the inner and outer yoke frames 8a and 8b in which the inner rotor 5a and the outer rotor 5b play a role of a yoke in which a number of magnets 6a and 6b are arranged to oppose each other.

Meanwhile, the BLDC motor 10 of the double-rotor/single-stator structure according to this invention employs a skew structure in the stator core 3a in order to offset cogging torque generated from the BLDC motor 10.

Figure 7A:
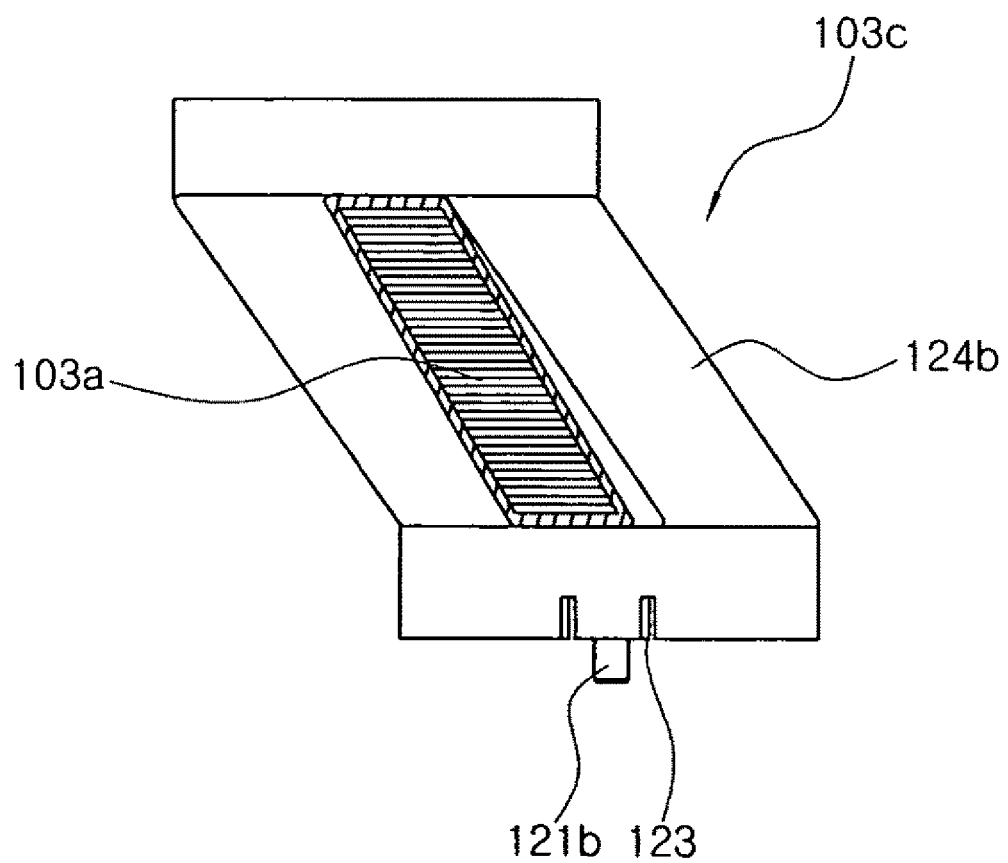
FIG. 7A is a cross-sectional view showing the central portion of a skew stator core in which a skew mode is applied.
Figure 7B:
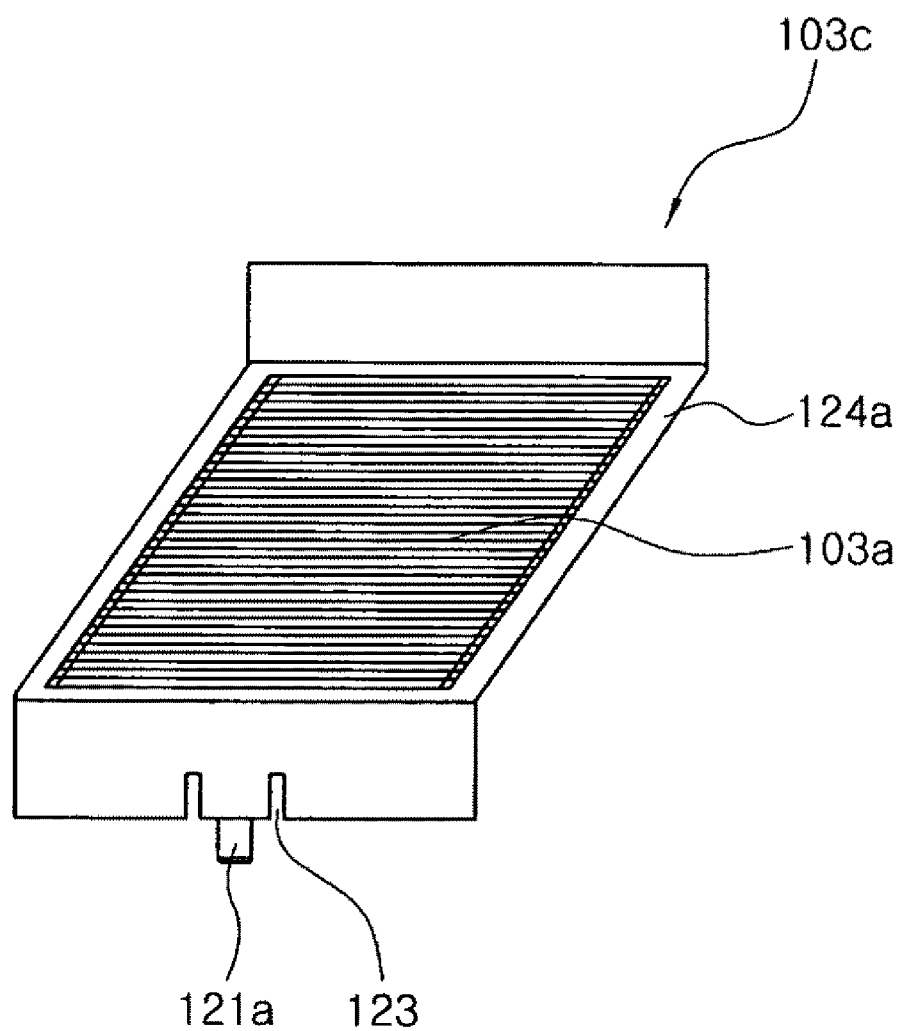
FIG. 7B is a side view of the skew stator core which is viewed from the external side.

FIG. 7A is a cross-sectional view showing the central portion of a skew stator core in which a skew mode is applied. FIG. 7B is a side view of the skew stator core which is viewed from the external side.

Referring to FIGS. 7A and 7B, a skew stator core 103a has a cross-section of a substantially I-shaped or T-shaped form. The bobbins 124a and 124b of the insulation material are combined on the outer circumference of the skew stator core 103a. The coil 3b is wound around a space provided by the bobbins 124a and 124b, to thus accomplish a skew stator core assembly 103.

In addition, the outer flange 124a of the bobbin 124 is formed in size relatively larger than that of the inner flange 124b, and a through-hole 123 is provided in order to withdraw a wiring line from the coil wound around the bobbin 124.

The through-hole 123 may be provided in the bobbin 24 of the stator core assembly 3c which does not employ the skew structure.

The bobbin 124 includes a winding portion of a rectangular box-type shape so that the coil can be wound in the middle of the bobbin 123, and the inner and outer flanges 124a and 124b that are bent and extended at the inner and outer sides of the winding portion. The coil is wound around the winding portion between the inner and outer flanges 124a and 124b.

The wiring lines of the coil are withdrawn through the through-holes 123 that are provided in the outer and inner flanges 124a and 124b where the coupling protrusions 121a and 121b are formed, to thus make drive signals input therethrough.

The inner and outer flanges 124a and 124b which are bent and extended from the inner and outer sides of a linearly shaped body of the skew stator core 103a, respectively, maintain a predetermined gap with respect to the annular inner and outer rotors 8a and 8b. For this purpose, the inner flange 124a is rounded inwards, and the outer flange 124b is rounded outwards. In addition, the stator 30 is generally formed in an annular form. Accordingly, it is desirable that the outer flange 124b is formed relatively larger than the inner flange 124a.

After the bobbin 124 has been assembled with the skew stator core 103a, the coil is wound around the independently perfectly divided skew stator assemblies 103c, respectively.

A skew can be given to the skew stator core 103a, in the range of 0-1 pitch, so as to obtain an effect of reducing cogging torque and noise/vibration. In this case, one pitch is decided as (360°/the number of slots). For example, one pitch is established as 20.0 in the case that the number of slots is 18.

Therefore, the BLDC motor 10 of the double-rotor/single-stator structure according to this invention can minimize torque ripple and can offset cogging torque which is increased by applying the skew stator core 103a.

Figure 8A:
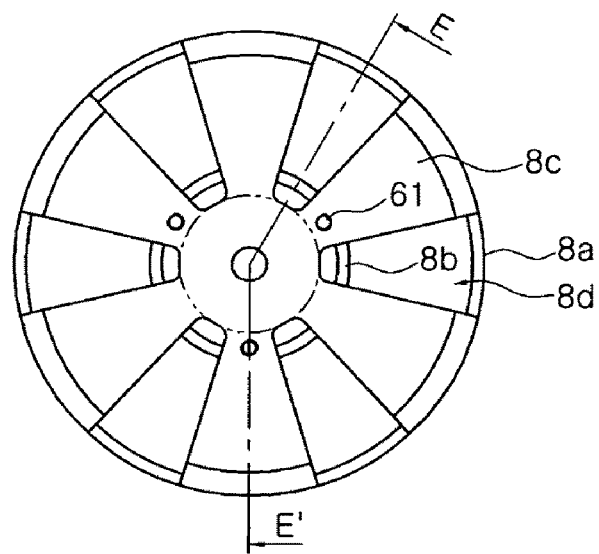
FIG. 8A is a plan view of a yoke frame of a BLDC motor of a double-rotor/single-stator structure according to the present invention.
Figure 8B:
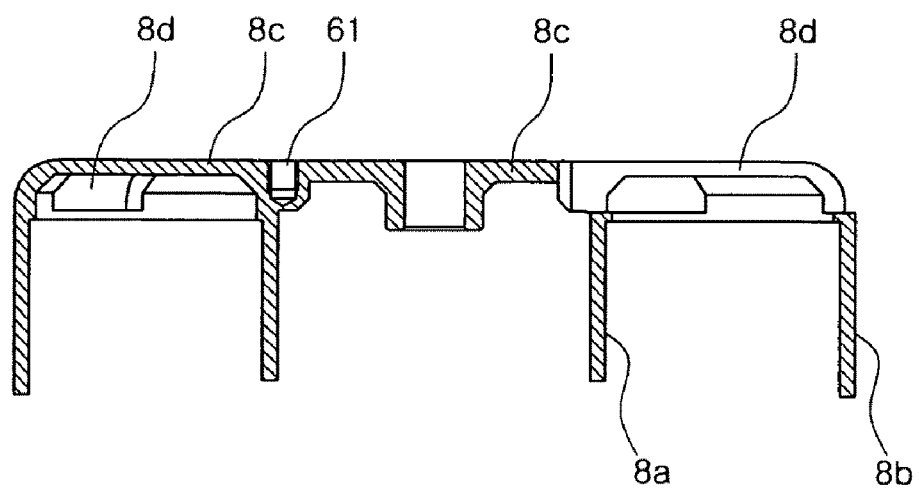
FIG. 8B is a cross-sectional view cut along a line E-O-E' of FIG. 8A.

FIG. 8A is a plan view of a yoke frame of a BLDC motor of a double-rotor/single-stator structure according to the present invention. FIG. 8B is a cross-sectional view cut along a line E-O-E' of FIG. 8A.

Referring to FIGS. 8a and 8b, a number of grooves (for example, three) which are impeller connection units 61 which is combined with the impeller 60 are formed at the upper side of the yoke frame 8 of the rotor 50. The inner and outer yoke frames 8a and 8b are formed in an annular form. In addition, the inner and outer yoke frames 8a and 8b are fixed to and supported by the rotational axis 9 through the yoke frame support 8c which is integrally formed.

The inner magnet 6a is combined on the outer circumferential surface of the inner yoke frame 8b, and the outer magnet 6b is combined on the inner circumferential surface of the outer yoke frame 8a, to thus accomplish a double-rotor structure.

In addition, a central hole into and with which the rotational axis 9 is inserted and combined is formed at the center of the yoke frame 8. A number of (for example, six) yoke frame supports 8c and a number of through-holes 8d where the yoke frame supports 8c are not formed are formed on the upper side of the yoke frame 8, to thereby minimize weight of the yoke frame 8 and ease rotation of the double-rotor 50. Accordingly, power of the BLDC motor 10 can be improved, and external air can be inhaled in order to cool the inner portion of the BLDC motor 10 by an air cooling method via the through-holes 8d. Here, it is desirable that the yoke frame supports 8c and the through-holes 8d are formed at equal interval.

The double-rotor 50 can embodied as a double yoke frame structure or as an integrated structure using an insert-molding method which is formed of a material which can form a magnetic circuit.

Figure 9A:
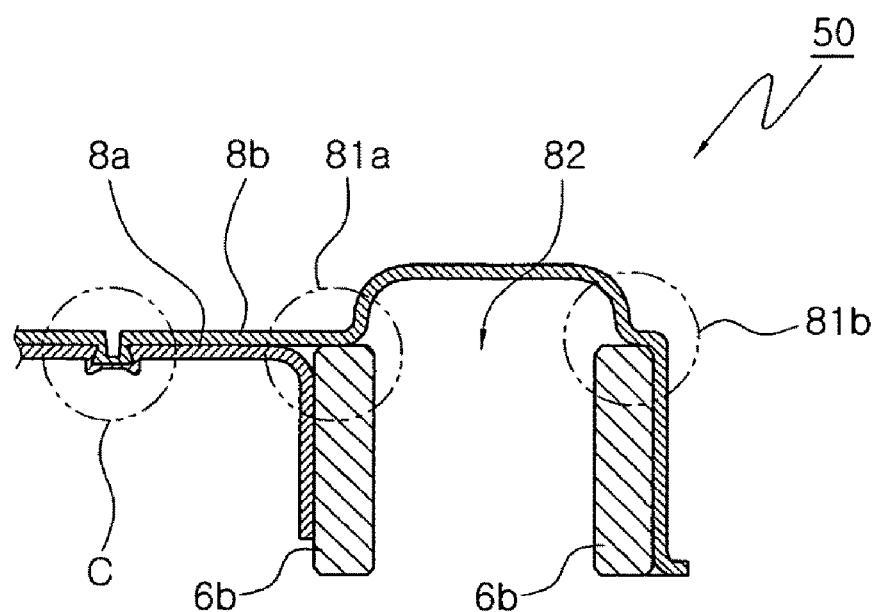
FIG. 9A is a cross-sectional view of a double-rotor structure using a double yoke frame.
Figure 9B:
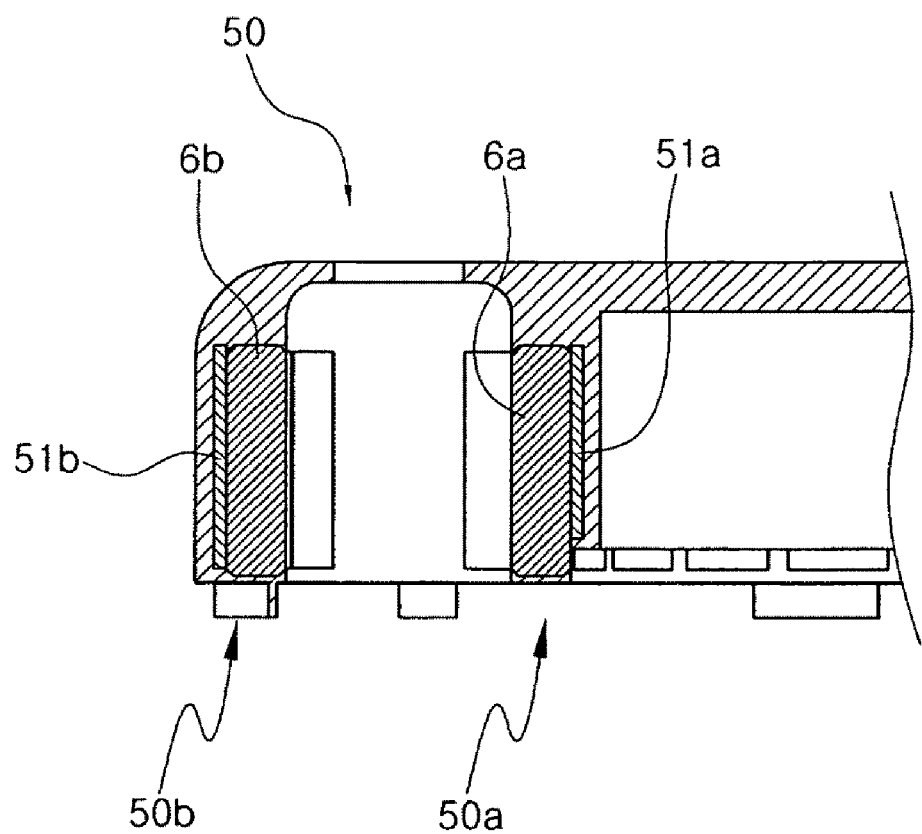
FIG. 9B is a cross-sectional view of a built-in type double-rotor structure that uses an insert molding method.

FIG. 9A is a cross-sectional view of a double-rotor structure using a double yoke frame, and FIG. 9B is a cross-sectional view of a built-in type double-rotor structure that uses an insert molding method.

Referring to FIG. 9A, the inner and outer yoke frames 8a and 8b of the yoke frame 8 are bent and molded by press, respectively. A first stepped portion structure 81a where the inner magnet 6a for use in the inner rotor 5a is installed is formed between the bent leading portion of the inner yoke frame 8a and the outer yoke frame 8b, and a second stepped portion structure 81b where the outer magnet 6b for use in the outer rotor 5b is installed is formed at the leading portion of the outer yoke frame 8b. In addition, an annular groove 82 into which the stator 30 can be inserted is formed between the first and second stepped portions 81a and 81b.

In this case, a number of the inner and outer magnets 6a and 6b are arranged in a manner that the N-pole and the S-pole are divided and magnetized, or are formed of divided pieces, a number of opposing magnets located on the opposing surface of the inner yoke frame 8a and the outer yoke frame 8b are arranged to have a mutually opposite polarity, and simultaneously are arranged to have a mutually opposite polarity with respect to adjoining different magnets.

The inner and outer yoke frames 8a and 8b can be integrally embodied using various kinds of coupling structures (C) as shown in FIGS. 10A to 10E.

Figure 10A:
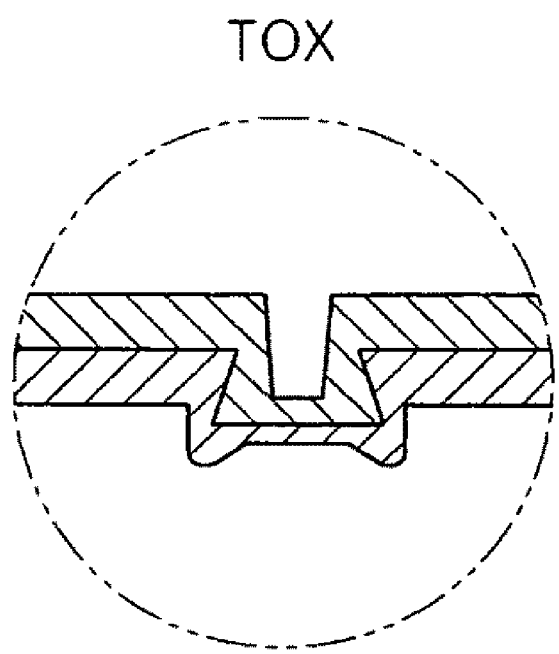
FIGS. 10A to 10E are views showing various types of coupling structures for integrating a yoke frame, respectively.
Figure 10B:
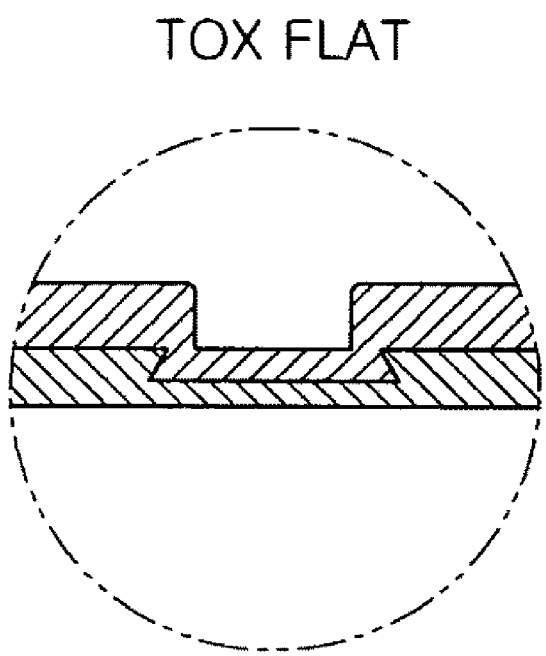
Figure 10C:
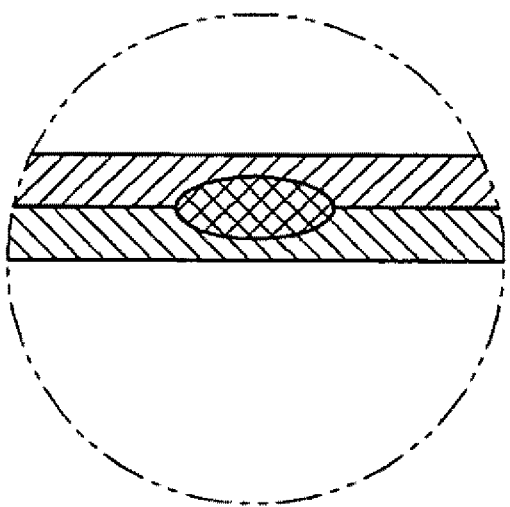
Figure 10D:
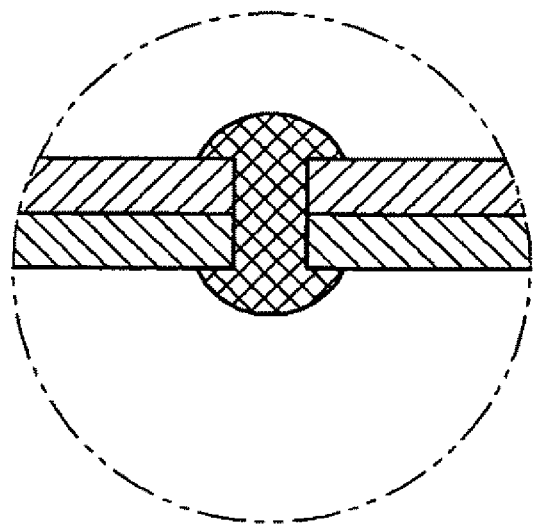
Figure 10E:
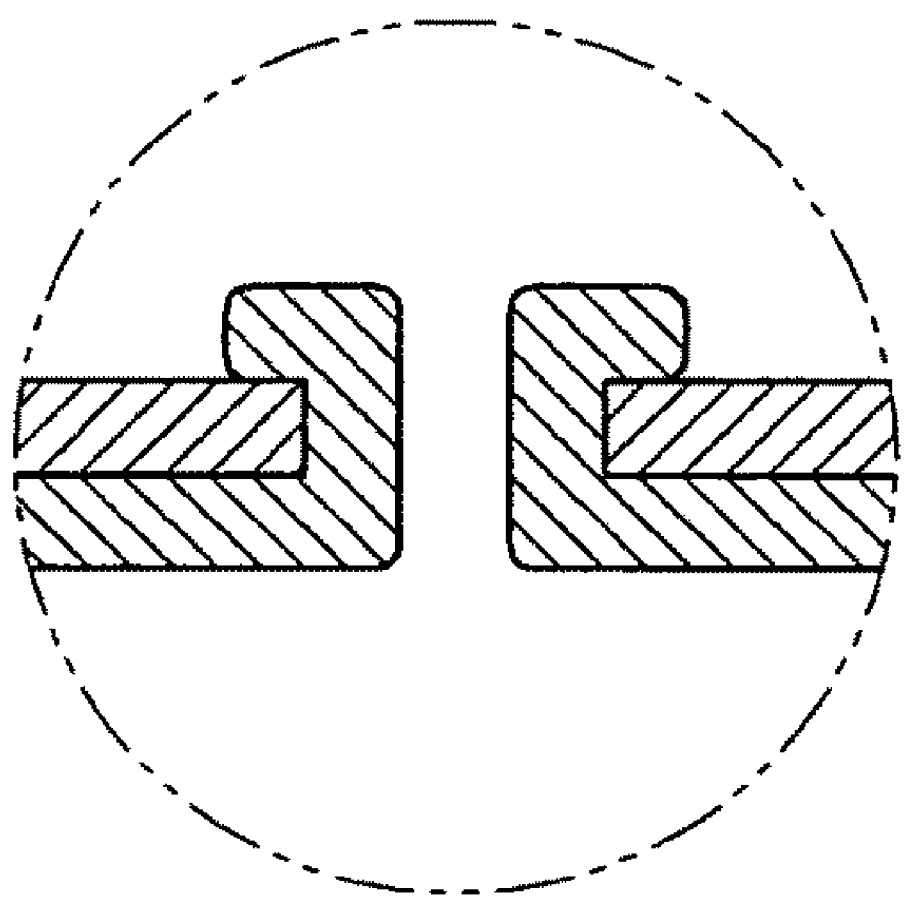

That is, the inner and outer yoke frames 8a and 8b can be combined using one among various kinds of coupling structures such as a TOX coupling structure of FIG. 10A, a Tox flat coupling structure of FIG. 10B, a spot welding coupling structure of FIG. 10C, a riveting coupling structure of FIG. 10D, and a calking coupling structure of FIG. 10E.

Meanwhile, referring to FIG. 9B, in the case of the integrated built-in type double-rotor 50, a number of N-pole and S-pole magnets 6a are arranged alternately at the outer side of the annular inner yoke 51a, to thereby form an inner rotor 50a, and a number of N-pole and S-pole magnets 6b are arranged alternately at the inner side of the annular outer yoke 51b, to thereby form an outer rotor 50a. For example, the integrated built-in type double-rotor 50 is integrally formed by an insert-molding method using a bulk molding compound (BMC).

In this case, the integrated built-in type double-rotor 50 is molded except for the opposing surface of the opposing magnets 6a and 6b that oppose the inner rotor 50a and the outer rotor 50b. The opposing magnets are arranged to have a respectively opposite polarity. Here, the inner and outer yokes 51a and 51b are formed to make a magnetic circuit formed between the inner portion of the stator core 3a and the inner and outer magnets 6a and 6b.

As described above, the integrated built-in type double-rotor 50 according to this invention does not need a special support plate because a number of magnets 6a and 6b that form the inner rotor 50a and the outer rotor 50b are integrally embodied using a bulk molding compound (BMC) that has a basic structural strength.

In addition, a number of magnets 6a and 6b of the inner rotor 50a and the outer rotor 50b are arranged concentrically by an insert-molding method, a deviation from roundness becomes high and thus it is possible to maintain a uniform magnetic gap when the number of magnets 6a and 6b of the inner rotor 50a and the outer rotor 50b are assembled with the stator 30.

[Mode for Invention]

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

[Industrial Applicability]

As described above, the present invention can be applied to a stator and a motor using the same, which improves productivity of the stator and reinforce durability of the stator, in which a stator core assembly is assembled using an assembly PCB which maximizes a contact surface of thermosetting resin and automatically sets an assembly position of the stator core assembly, and then the whole surface of the stator core assembly is molded. In addition, the present invention can be applied to a vehicle cooler of various kinds of vehicles (a hybrid electric vehicle (HEV), a fuel cell battery vehicle (FCEV), a fuel cell electric vehicle (FCEV) and an internal combustion engine vehicle), using the motor.

The invention claimed is:

1. A stator for a brushless direct-current (BLDC) motor, the stator comprising:
a number of stator core assemblies, each stator core assembly including a division type stator core respectively receiving a bobbin thereon, the bobbin having inner and outer flanges, the inner and outer flanges respectively having first and second coupling protrusions extending therefrom and spaced one from the other in a direction of an axis of the division type stator core, the stator core assembly including a coil wound around the bobbin; and
a printed circuit board (PCB) for an assembly where each stator core assembly is automatically position-set and then assembled and two end portions of each coil are mutually connected to respective phases of a three phase circuit arrangement,
wherein the assembly PCB comprises:
a central area formed in an annular contour, and having a number of conduction lines printed on a lower surface to connect the coil of each stator core assembly to a corresponding phase; and
a number of coupling areas each extending radially from an opposing inner and outer side of the central area, each coupling area being smaller in area than an area of a lower end of a corresponding one of the stator core assemblies each coupling area having first and second coupling grooves formed therein and receiving the first and second coupling protrusions of the bobbin of the corresponding one of the stator core assemblies,
wherein the PCB is integrally formed with stator core assemblies by a thermosetting resin, and wherein the coupling areas being smaller in area than the lower ends of the corresponding stator core assemblies maximizes a contact area of the thermosetting resin between the PCB and the stator core assemblies.

2. A double-rotor-and-single-stator structure brushless direct-current (BLDC) motor comprising:
an impeller;
a double-rotor having an impeller combined with an upper side thereof, the double rotor having a multiplicity of N-pole and S-pole magnets disposed on different concentric circles arranged alternately in an annular form to define inner and outer rotors disposed so that the magnets opposing each other have a predetermined distance between the respective inner or outer portion and opposite polarity;
a stator having a mutual gap between the inner and outer rotors, and integrally formed in an annular form by insert molding a plurality of stator core assemblies using a thermosetting resin, the plurality of stator core assemblies being assembled to a printed circuit board (PCB), each stator core assembly including a bobbin from which first and second coupling protrusions extend and on which a coil is wound, the bobbin being disposed on a division type stator core, the PCB including a central area formed in an annular contour, the central area having a number of conduction lines printed on a lower surface thereof to connect the coil of each stator core assembly to a corresponding electrical phase of a three phase circuit arrangement, the PCB further including a plurality of coupling areas each extending radially from an opposing inner and outer side of the central area, each coupling area being smaller in area than an area of a lower end of a corresponding one of the plurality of stator core assemblies, each coupling area having first and second coupling grooves formed therein and receiving the first and second coupling protrusions extending from the bobbin of a corresponding one of the stator core assemblies,
wherein the PCB is integrally formed with the stator core assemblies by a thermosetting resin, and wherein the coupling areas being smaller in area than the lower ends of the corresponding stator core assemblies maximizes a contact area of the thermosetting resin between the PCB and the stator core assemblies;
a rotational axis having one end portion fixed to a center of the double-rotor; and
a pair of bearings disposed at a central portion of the holder for supporting the rotational axis.

3. The double-rotor-and-single-stator structure brushless direct-current (BLDC) motor according to claim 2, wherein the stator further comprises a Hall element positioned to oppose a lower portion of the inner rotor for detecting a polarity of a corresponding magnet of the inner rotor.

4. The double-rotor-and-single-stator structure brushless direct-current (BLDC) motor according to claim 2, wherein each bobbin includes an inner flange and an outer flange and through-holes are formed through at least one of the inner and outer flanges,
wherein two ends of the coil wound on the bobbing pass through the through-holes to be electrically connected with the conduction line printed on the central area.

5. The double-rotor-and-single-stator structure brushless direct-current (BLDC) motor according to claim 3, wherein the double-rotor comprises:
an inner yoke;
the inner rotor including a plurality of first N-pole and first S-pole magnets arranged alternatingly on an outer circumference of the inner yoke;

an outer yoke having a diameter relatively larger than a diameter of the inner yoke to maintain a certain distance from the inner yoke;

the outer rotor including a plurality of second N-pole and second S-pole magnets arranged alternatingly on an inner circumference of the outer yoke in which the plurality of second N-pole and second S-pole magnets correspondingly opposing the plurality of the first N-pole and first S-pole magnets are disposed to have a respective opposite polarity; and a yoke frame fixedly supports the inner yoke and the outer yoke and has a number of fixing grooves formed in an upper side thereof for combining the impeller therewith, and wherein a length of the inner yoke is formed shorter than that of the outer rotor by a height of the Hall element.

6. The double-rotor-and-single-stator structure brushless direct-current (BLDC) motor according to claim 2, wherein each bobbin includes an inner flange and an outer flange, and the BLDC motor is formed of an 18-core-24-pole structure, and a skew is applied to the stator core assemblies within one pitch range defined as 360°/the number of cores, so that the outer and inner flanges of the bobbin are extended.

7. A cooler for a vehicle comprising:

a radiator that cools a vehicle engine block using a water cooling method; and a cooling unit that generates an air current to remove heat from the radiator, wherein the cooling unit comprises:

a double-rotor having a plurality of N-pole and S-pole magnets disposed annularly on each of two different concentric circles to define an inner rotor and an outer rotor, each of the inner and outer rotors having N-pole and S-pole magnets disposed alternatingly with corresponding magnets of the inner and outer rotors being of opposite polarity and having a predetermined distance being of opposite polarity therebetween;

an integrally built-in type stator disposed on the radiator and having an annular contour and installed with a mutual gap between the inner and outer rotors, the stator including a plurality of the stator core assemblies secured by the thermosetting resin, each stator core assembly including a division type stator core, a bobbin received on the division type stator core and a coil wound on the bobbin, the stator including a printed circuit board (PCB) having the plurality of stator core assemblies mounted thereon, the PCB having an annular central area with a number of conduction lines printed on a surface thereof to connect the coils of the plurality stator core assemblies to a respective electrical phase of a three phase circuit arrangement, the PCB further including a plurality of coupling areas each extending radially from an opposing inner and outer side of the central area, each coupling area being smaller in area than an area of a lower end of a corresponding one of the plurality of stator core assemblies, wherein the PCB is integrally formed with the stator core assemblies by a thermosetting resin, and wherein the coupling areas being smaller in area than the lower ends of the corresponding stator core assemblies maximizes a contact area of the thermosetting resin between the PCB and the stator core assemblies;

an impeller combined with the upper side surface of the double-rotor for generating an air current to remove heat from the radiator responsive to rotation of the double-rotor;

a rotational axis having an end portion fixed to a central portion of the double-rotor; and a pair of bearings for rotatably supporting the rotational axis disposed at a central portion of a stator holder.

8. The cooler for a vehicle according to claim 7, wherein the combination of the double-rotor and the stator constitutes a motor and the motor is formed of an 18-core-24-pole structure, and skew is applied to the stator core assemblies within one pitch range defined as 360°/the number of cores.

* * * * *